United States Patent
Tachibana

(10) Patent No.: US 10,719,381 B2
(45) Date of Patent: Jul. 21, 2020

(54) IMAGE PROCESSING APPARATUS, METHOD FOR CONTROLLING IMAGE PROCESSING APPARATUS, AND STORAGE MEDIUM FOR DISPLAYING A MOVING IMAGE INDICATING A MAINTENANCE METHOD

(71) Applicant: CANON KABUSHIKI KAISHA, Tokyo (JP)

(72) Inventor: Yoshiro Tachibana, Kashiwa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 195 days.

(21) Appl. No.: 15/710,516

(22) Filed: Sep. 20, 2017

(65) Prior Publication Data
US 2018/0089016 A1    Mar. 29, 2018

(30) Foreign Application Priority Data
Sep. 27, 2016    (JP) .................................. 2016-188415

(51) Int. Cl.
  *G06F 11/00*    (2006.01)
  *G06F 11/07*    (2006.01)
  (Continued)

(52) U.S. Cl.
  CPC ....... *G06F 11/0769* (2013.01); *G03G 15/502* (2013.01); *G03G 15/556* (2013.01);
  (Continued)

(58) Field of Classification Search
  CPC .... G06F 11/327; G06F 11/328; G06F 11/324; G06F 11/0733; G06F 11/0769;
  (Continued)

(56) References Cited

U.S. PATENT DOCUMENTS 6,601,159 B1 *    7/2003  Smith ..................... G03G 15/50
                                                               399/11
7,403,721 B2 *    7/2008  Yamada ................. G03G 15/70
                                                               399/16
(Continued)

FOREIGN PATENT DOCUMENTS

JP    2015-82706 A    4/2015
JP    2015-123633 A    7/2015
(Continued)

*Primary Examiner* — Marc Duncan
(74) *Attorney, Agent, or Firm* — Canon U.S.A., Inc. IP Division

(57) ABSTRACT

There is provided an image forming apparatus that performs control so as to display a first maintenance screen containing a moving image indicating a work content required to resolve a maintenance event on a display unit in a case where occurrence of the maintenance event is detected by an event detection unit configured to detect the occurrence of the maintenance event that has occurred therein. Then, the image forming apparatus performs control so as to display a second maintenance screen containing the moving image indicating the work content required to resolve the maintenance event on the display unit according to a display instruction issued from a user in a case where the occurrence of the maintenance event is not detected by the event detection unit.

20 Claims, 26 Drawing Sheets

(51) Int. Cl.
  *G03G 15/00* (2006.01)
  *G03G 21/16* (2006.01)
  *G06F 11/32* (2006.01)
(52) U.S. Cl.
  CPC ......... *G03G 15/70* (2013.01); *G06F 11/0733* (2013.01); *G03G 15/5079* (2013.01); *G03G 21/1633* (2013.01); *G06F 11/0787* (2013.01); *G06F 11/327* (2013.01)
(58) Field of Classification Search
  CPC ............. G06F 11/0787; G06F 11/0784; G03G 15/502; G03G 15/5016; G03G 15/5079; G03G 15/55; G03G 15/553; G03G 15/556; G03G 15/70; G03G 15/703; G03G 21/1633; G03G 21/1638; G03G 2215/00345; H04N 1/00543; H04N 1/00551; H04N 1/00506
  See application file for complete search history.

(56) References Cited

U.S. PATENT DOCUMENTS

| | | | |
|---|---|---|---|
| 9,113,016 B2* | 8/2015 | Tachibana | H04N 1/00408 |
| 2004/0057743 A1* | 3/2004 | McIntyre | G03G 15/5016 |
| | | | 399/81 |
| 2007/0237537 A1* | 10/2007 | Hasegawa | G03G 15/55 |
| | | | 399/81 |
| 2013/0197899 A1* | 8/2013 | Roulland | G06F 11/0733 |
| | | | 704/9 |
| 2014/0146342 A1* | 5/2014 | Ishii | G06K 15/4085 |
| | | | 358/1.14 |
| 2015/0104211 A1* | 4/2015 | Sato | G03G 15/502 |
| | | | 399/81 |
| 2015/0109637 A1* | 4/2015 | Ikeda | H04N 1/0049 |
| | | | 358/1.15 |
| 2015/0168906 A1* | 6/2015 | Ishii | G03G 15/70 |
| | | | 399/21 |
| 2015/0172477 A1 | 6/2015 | Yamamoto | |
| 2018/0091666 A1* | 3/2018 | Tachibana | G03G 15/502 |
| 2018/0198931 A1* | 7/2018 | Nakajima | H04N 1/00506 |

FOREIGN PATENT DOCUMENTS

| | | |
|---|---|---|
| JP | 2016-158260 A | 9/2016 |
| JP | 2018-008388 A | 1/2018 |

* cited by examiner

FIG.4A

| MAINTENANCE ID | MOVING IMAGE LIST |
|---|---|
| 001 | A1, A2, A3 |
| 002 | B1, B2, B3, B10 |
| 003 | B1, B4, B5, B10 |
| 004 | B1, B6, B7, B10 |
| 005 | B1, B8, B9, B10 |
| 006 | B1, B2, B3, B4, B5, B10 |
| 007 | B1, B2, B3, B6, B7, B10 |
| 008 | B1, B2, B3, B8, B9, B10 |
| 009 | B1, B4, B5, B6, B7, B10 |
| 010 | B1, B4, B5, B8, B9, B10 |
| 011 | B1, B6, B7, B8, B9, B10 |
| 012 | B1, B2, B3, B4, B5, B6, B7, B10 |
| 013 | B1, B2, B3, B4, B5, B8, B9, B10 |
| 014 | B1, B2, B3, B6, B7, B8, B9, B10 |
| 015 | B1, B4, B5, B6, B7, B8, B9, B10 |
| 016 | B1, B2, B3, B4, B5, B6, B7, B8, B9, B10 |
| 017 | C1, C2, C4 |
| 018 | C1, C3, C4 |
| 019 | C1, C2, C3, C4 |
| ... | |

FIG.4B

| MOVING IMAGE ID (411) | MOVING IMAGE FILE (412) | PLAYBACK DURATION (413) | COVER OPEN/ CLOSE FLAG (414) | MESSAGE (415) |
|---|---|---|---|---|
| A1 | /movie/A1.mpeg | 0:13 | 0 | PLEASE PREPARE A NEW WASTE TONER CONTAINER, AND OPEN THE FRONT COVER. |
| A2 | /movie/A2.mpeg | 0:14 | 1 | PLEASE UNLOAD THE WASTE TONER CONTAINER BY HOLDING THE HANDLE. |
| A3 | /movie/A3.mpeg | 0:27 | 1 | PLEASE SET THE NEW WASTE TONER CONTAINER, AND CLOSE THE FRONT COVER. |
| B1 | /movie/B1.mpeg | 0:13 | 0 | PLEASE PREPARE A NEW TONER CONTAINER AND OPEN THE FRONT COVER. |
| B2 | /movie/B2.mpeg | 0:10 | 1 | PLEASE UNLOAD THE BLACK TONER CONTAINER. |
| B3 | /movie/B3.mpeg | 0:30 | 1 | PLEASE SET A NEW BLACK TONER CONTAINER ALL THE WAY INSIDE. |
| B4 | /movie/B4.mpeg | 0:10 | 1 | PLEASE UNLOAD THE YELLOW TONER CONTAINER. |
| B5 | /movie/B5.mpeg | 0:30 | 1 | PLEASE SET A NEW YELLOW TONER CONTAINER ALL THE WAY INSIDE. |
| B6 | /movie/B6.mpeg | 0:10 | 1 | PLEASE UNLOAD THE MAGENTA TONER CONTAINER. |
| B7 | /movie/B7.mpeg | 0:30 | 1 | PLEASE SET A NEW MAGENTA TONER CONTAINER ALL THE WAY INSIDE. |
| B8 | /movie/B8.mpeg | 0:10 | 1 | PLEASE UNLOAD THE CYAN TONER CONTAINER. |
| B9 | /movie/B9.mpeg | 0:30 | 1 | PLEASE SET A NEW CYAN TONER CONTAINER ALL THE WAY INSIDE. |
| B10 | /movie/B10.mpeg | 0:17 | 1 | PLEASE CLOSE THE FRONT COVER. |
| C1 | /movie/C1.mpeg | 0:20 | 0 | PLEASE OPEN THE RIGHT COVER. |
| C2 | /movie/C2.mpeg | 0:15 | 1 | PLEASE REMOVE THE PAPER JAM AT THE POSITION INDICATED IN THE ILLUSTRATION. |
| C3 | /movie/C3.mpeg | 0:15 | 1 | PLEASE REMOVE THE PAPER JAM AT THE TWO-SIDED CONVEYANCE PORTION. |
| C4 | /movie/C4.mpeg | 0:10 | 1 | PLEASE CLOSE THE RIGHT COVER. |
| | | | | ... |

410

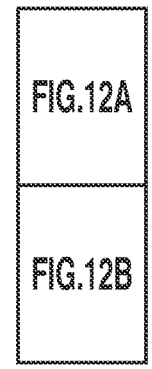
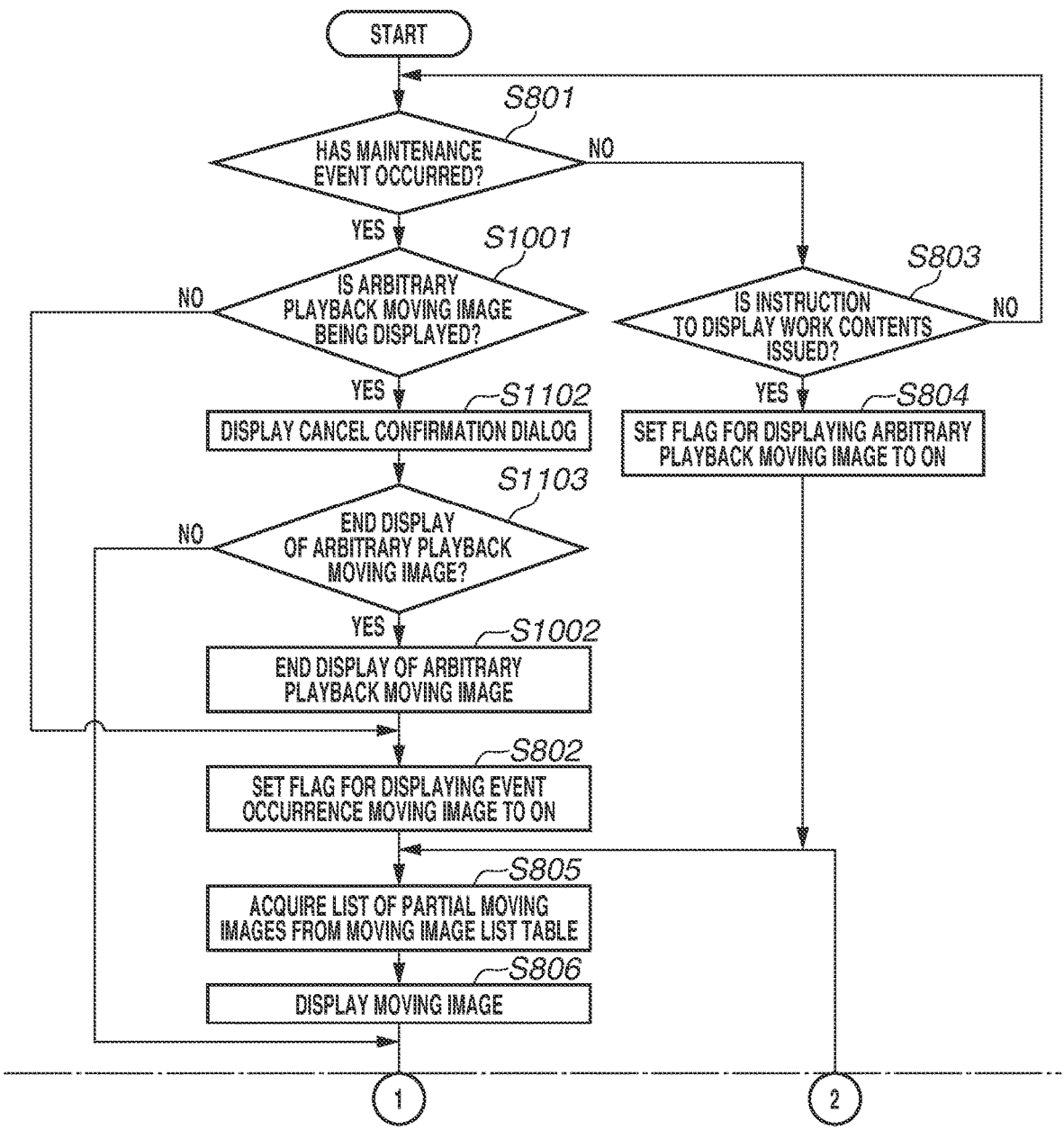
FIG.12A

IMAGE PROCESSING APPARATUS, METHOD FOR CONTROLLING IMAGE PROCESSING APPARATUS, AND STORAGE MEDIUM FOR DISPLAYING A MOVING IMAGE INDICATING A MAINTENANCE METHOD

BACKGROUND OF THE INVENTION

Field of the Invention

The present invention relates to an image processing apparatus that displays a moving image indicating a maintenance method, a method for controlling the image processing apparatus, and a storage medium.

Description of the Related Art

Conventionally, there has been proposed an image forming apparatus configured to present a work content at the time of maintenance, such as clearing a jam, replacing a toner container, and replenishing staples of a stapler with use of a moving image (see Japanese Patent Application Laid-Open No. 2015-82706). This function is intended to allow a user to further smoothly carry out the maintenance with the aid of rich expressiveness of the moving image and an abundant amount of information in the moving image.

Such an image forming apparatus prepares the moving image for each work content (work element) in advance, and, when a maintenance event has occurred, presents a series of work contents required to resolve the corresponding maintenance event to the user by combining a plurality of moving images, each of which is prepared for each work content. For example, when occurrence of the jam is detected at a conveyance portion, the plurality of moving images is played back in an order of a moving image indicating work of opening a cover provided on a housing, a moving image indicating work of removing jammed paper at the conveyance portion after the cover is opened, and a moving image indicating work of closing the cover after the jammed paper is removed.

However, the conventional image forming apparatus is configured to, only when the maintenance event, such as the jam and a lack of toner, has occurred, allow the user to confirm the series of work contents required to resolve this maintenance event with use of the moving images. As a result, when the user wants to confirm the series of work contents by the moving images for the purpose of learning the work contents, the user cannot confirm the work contents in advance unless the maintenance event has occurred at this timing. Thus, the conventional image forming apparatus raises such a problem that, for example, when a person in charge of setting up the image forming apparatus explains the work contents for clearing the jam while showing the moving images to a customer, the person has to intentionally cause the jam by, for example, performing an operation of opening the cover of the image forming apparatus in the middle of printing, thereby undesirably wastefully consuming the toner and a sheet. Further, when the person explains the work contents to be performed at the time of the replenishment of consumables such as the toner and the staples, the person has to use up the toner or the staples, and therefore has to spend an extremely large amount of time and labor.

The present invention has been made in consideration of such a problem, and is directed to an image processing apparatus that, even under a situation where the maintenance event has not occurred, allows the user to arbitrarily confirm the maintenance method corresponding to this maintenance event with use of the moving image.

SUMMARY OF THE INVENTION

According to an aspect of the present invention, an image processing apparatus includes an event detection unit configured to detect a maintenance event, a detection unit configured to detect whether a predetermined cover of the image processing apparatus is in an open state or a closed state, a reception unit configured to receive, from a user, an instruction to display a first maintenance method corresponding to a maintenance event, a display control unit configured to control display of the first maintenance method and a second maintenance method, each method comprising display of, in order, an advance preparation moving image which indicates steps for opening the predetermined cover, and a main moving image which indicates steps to be performed after the detection unit detects that the predetermined cover is in an open state such that the first maintenance method is displayed according to the instruction received by the reception unit, and without the detection of a maintenance event, and the second maintenance method is displayed according to the maintenance event detected by the detection unit, wherein the display control unit is further configured to not change the moving image being displayed in a case where the detection unit detects that the predetermined cover is opened at a time that the first maintenance method is displayed, and change, in a case where the detection unit detects that the predetermined cover is opened at a time that the second maintenance method is displayed, the displayed moving image to initiate display the main moving image of the second maintenance method.

According to another aspect of the present invention, an image processing apparatus includes an event detection unit configured to detect a maintenance event, a reception unit configured to receive from a user an instruction to display a maintenance method corresponding to the maintenance event, a display control unit configured to, according to the detection of the maintenance event by the event detection unit, display a first maintenance screen for playing back, in order, an advance preparation moving image indicating work of opening a cover corresponding to a location where this maintenance event has occurred and a main moving image indicating work to be performed after this cover is opened, and, according to the reception of the instruction to display the maintenance method by the reception unit without the maintenance event detected by the event detection unit, display a second maintenance screen for playing back, in order, the advance preparation moving image and the main moving image, and a detection unit configured to detect an opened/closed state of the cover, wherein the display control unit performs control so as to display a screen for prompting the user to close the cover in a case where the detection unit detects that the cover is brought into the opened state while the second maintenance screen is displayed, and so as not to display this screen in a case where the detection unit detects that the cover is brought into the opened state while the first maintenance screen is displayed.

Further features of the present invention will become apparent from the following description of exemplary embodiments with reference to the attached drawings.

BRIEF DESCRIPTION OF THE DRAWINGS

FIGS. 4A and 4B are data structure tables defining a relationship between a maintenance event and a moving image according to the exemplary embodiment of the present invention.

DESCRIPTION OF THE EMBODIMENTS

In the following description, exemplary embodiments of the present invention will be described with reference to the drawings.

Figure 1:
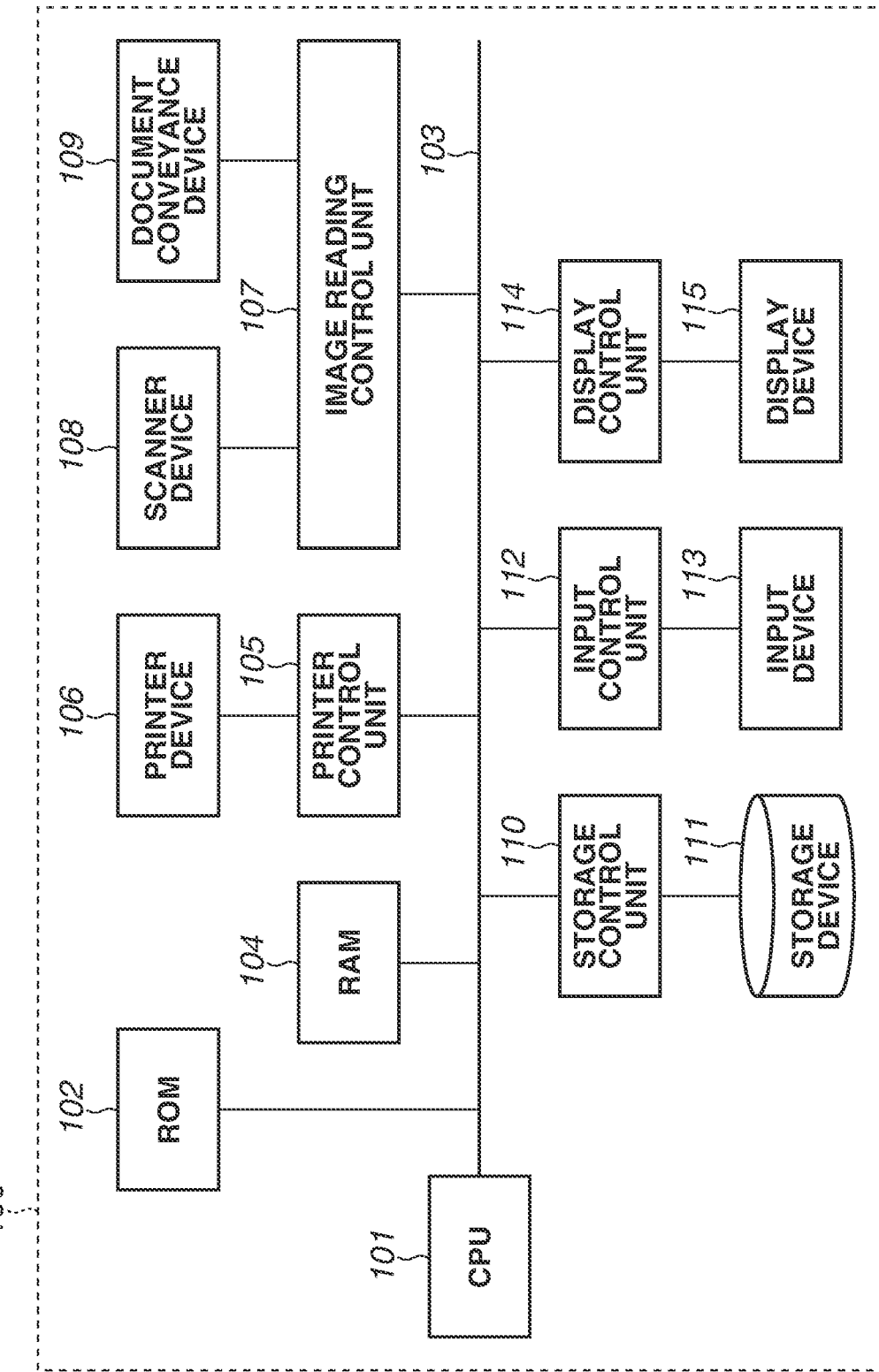
FIG. 1 is a block diagram illustrating a schematic configuration of an image forming apparatus according to an exemplary embodiment of the present invention.

FIG. 1 is a block diagram illustrating a schematic configuration of an image forming apparatus 100 according to a first exemplary embodiment.

In FIG. 1, the image forming apparatus 100 includes a central processing unit (CPU) 101, a read only memory (ROM) 102, a random access memory (RAM) 104, a printer control unit 105, an image reading control unit 107, a storage control unit 110, an input control unit 112, and a display control unit 114. They are connected to one another via a bus 103. Further, the image forming apparatus 100 includes a storage device 111, a printer device 106, a scanner device 108, a document conveyance device 109, an input device 113, and a display device 115.

The CPU 101 controls entire image forming apparatus 100. The CPU 101 activates an operating system (OS) by a boot program stored in the ROM 102. Then, the CPU 101 executes a program stored in the storage device 111 on this OS.

The RAM 104 is used as a temporary storage area, such as a main memory and a work area for the CPU 101. When the CPU 101 executes the program, the CPU 101 reads out this program from the storage device 111 and stores the read program into the RAM 104.

The printer control unit 105 controls the printer device 106 to print image data on a sheet, such as paper. The printer device 106 prints the image data on the sheet.

The image reading control unit 107 controls the scanner device 108 to read an image on a document and generate image data. Further, the image reading control unit 107 controls the document conveyance device 109, such as an automatic document feeder (ADF), to convey a document placed on a document positioning plate of the document conveyance device 109 one by one to the scanner device 108, and cause the scanner device 108 to generate the image data. The scanner device 108 scans the document with use of an optical reading device, such as a charge coupled device (CCD) sensor, and converts image information on the document into electric signal data.

The storage device 111 is a readable and writable non-volatile storage device, such as a hard disk drive (HDD). This storage device 111 stores various kinds of data, such as a program for controlling the entire image forming apparatus 100, various kinds of application programs, and a moving image indicating a series of work contents required to resolve a maintenance event. Each of these programs is executed by the CPU 101. The storage control unit 110 controls the storage device 111.

The input control unit 112 receives an operation instruction of a user via the input device 113, such as a touch panel and hardware keys. The display control unit 114 controls the display device 115, such as a liquid crystal display (LCD) and a cathode ray tube (CRT), to display an operation screen and the moving image to the user.

Figure 2:
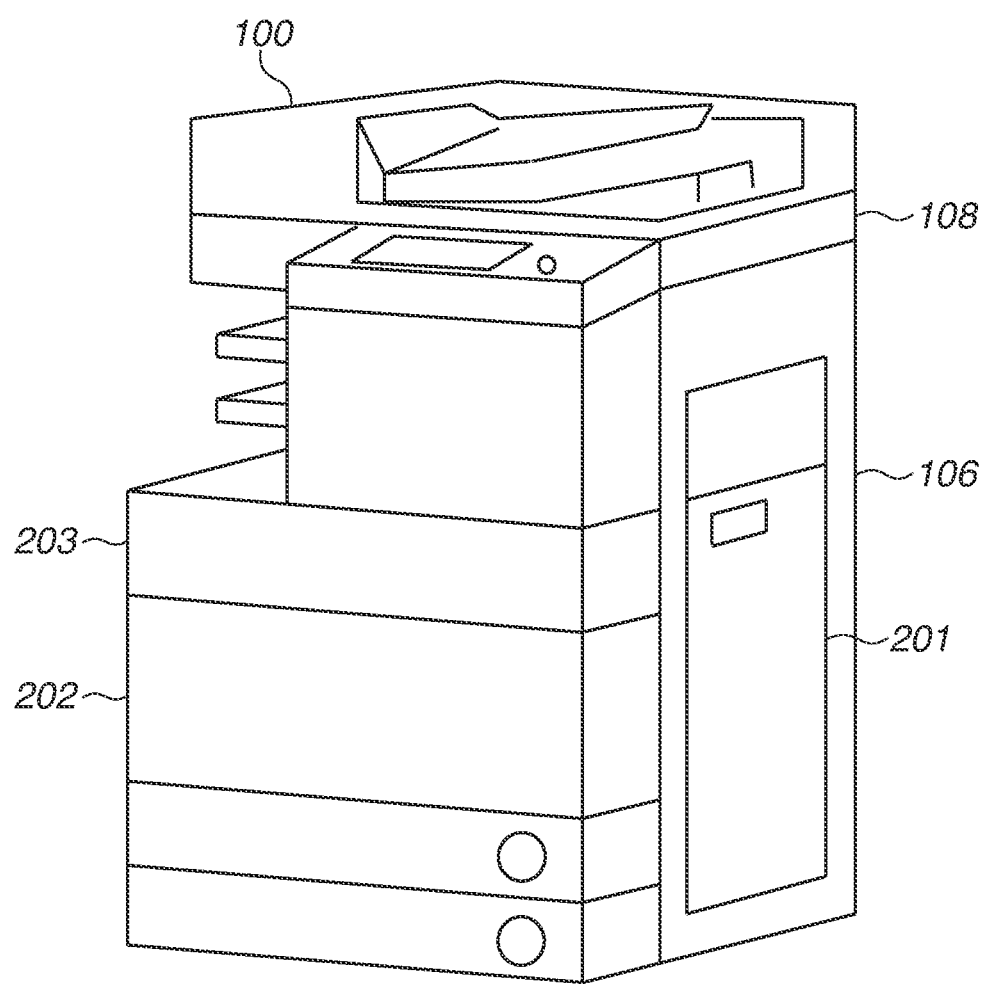
FIG. 2 is an external view illustrating an external appearance of the image forming apparatus according to the exemplary embodiment of the present invention.

FIG. 2 is an external view illustrating an external appearance of the image forming apparatus 100.

FIG. 2 illustrates a right cover 201 and a front cover 202 provided to the image forming apparatus 100. The right cover 201 is used to expose a conveyance path of the sheet to remove jammed paper. The front cover 202 is used to, when a toner container and a waste toner container are replaced, expose locations where they are loaded. The image forming apparatus 100 includes a sensor that detects an opened/closed state of each of the above-described right cover 201 and front cover 202.

Figure 3:
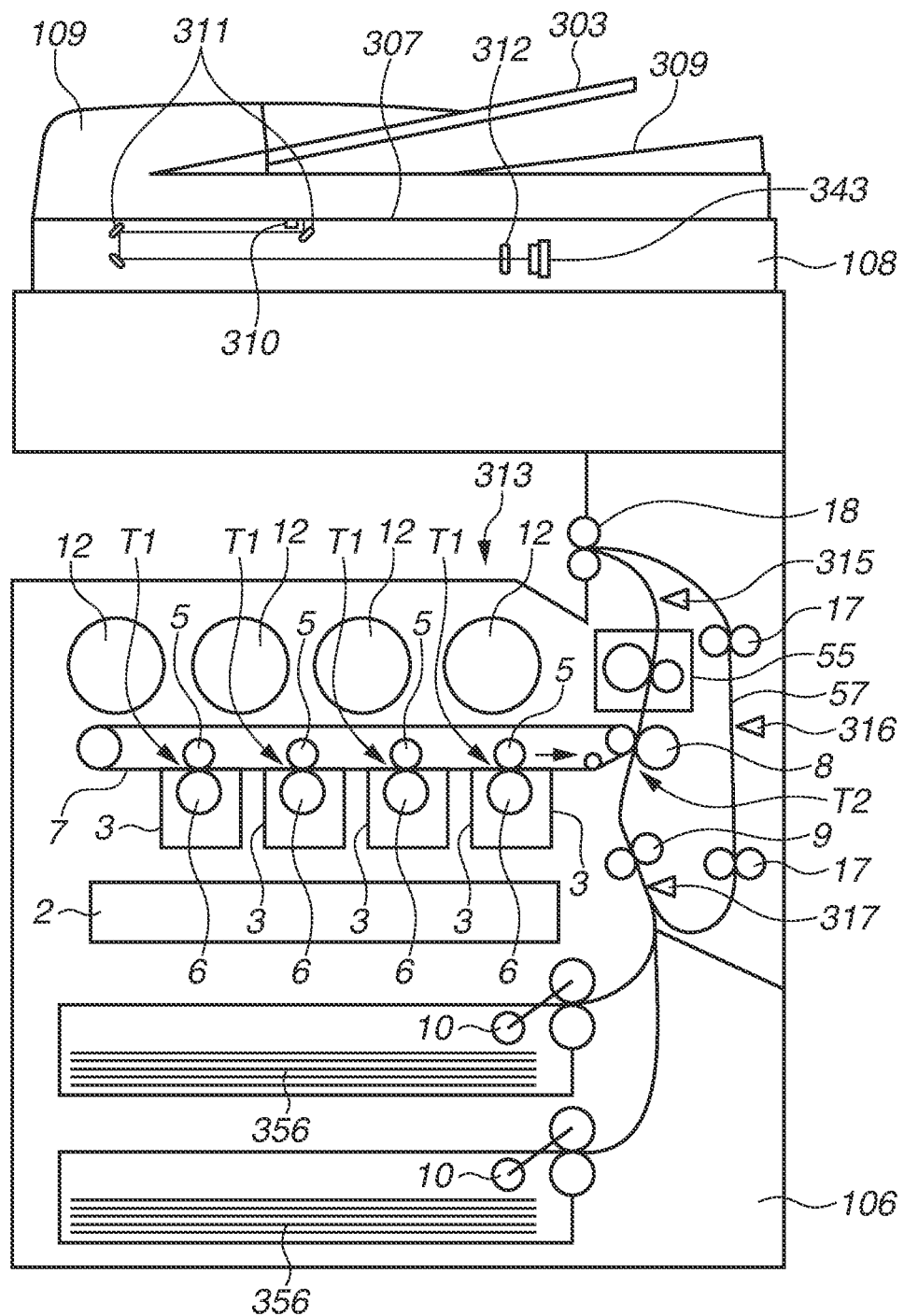
FIG. 3 is a cross-sectional view illustrating an internal configuration of the image forming apparatus according to the exemplary embodiment of the present invention.

FIG. 3 is a cross-sectional view illustrating an internal configuration of the image forming apparatus 100.

The internal configuration illustrated in FIG. 3 indicates one example in a full-color image forming apparatus that uses, for example, yellow, magenta, cyan, and black. Further, the image forming apparatus 100 is a so-called tandem type image forming apparatus in which four photosensitive drums 6 as image bearing members each bearing a toner image of each of the yellow, magenta, cyan, and black colors are arranged side by side in a direction in which an intermediate transfer belt 7 as an intermediate transfer unit runs. The image forming apparatus 100 configured in this manner includes the scanner device 108, the document conveyance device 109, and the printer device 106.

First, a reading operation performed by the scanner device 108 will be described.

When the reading operation is performed in a state where the document is set on the document positioning plate, the user sets the document on a document positioning plate 307 and closes the document conveyance device 19. When an opening/closing sensor detects that the document conveyance device 109 is closed, a reflective document size detection sensor located in a housing of the scanner device 108 detects a size of the document set on the document positioning plate 307. When the size of the document is detected, a light source 310 illuminates the document, and the illuminated light is incident on a CCD sensor 343 via a reflection plate 311 and a lens 312. The CCD sensor 343 converts the incident light into a digital signal and transmits the converted signal to a controller of the scanner device 108. The controller performs desired image processing on the transmitted digital signal to convert the digital signal into a laser recording signal, and stores the converted signal into a memory as the image data.

When the reading operation is performed in a state where the document is set on the document conveyance device 109, the user places the document on a tray of a document setting portion 303 of the document conveyance device 109 in such a manner that the document is laid face up. When the document is placed, a document presence/absence detection sensor detects that the document is set. When the document presence/absence detection sensor detects that the document is set, the controller rotates a document feeding roller and a conveyance belt to convey the document to a predetermined reading position on the document positioning plate 307. When the document is conveyed to the predetermined reading position, the controller performs an operation of reading the document and stores the image data generated by the operation of reading the document into the memory. Then, the controller discharges the document for which the reading operation is completed to a document discharge tray 309 via a conveyance roller.

When there is a plurality of documents set on the document conveyance device 109, the controller feeds a next document with use of the feeding roller and performs an operation of reading the next document at the same time as discharging the document for which the reading operation is completed. An operation of reading the plurality of documents is performed in this manner.

Next, a printing operation performed by the printer device 106 will be described.

The printer device 106 includes a process cartridge 3 of each of the colors, an exposure unit (not-illustrated) that illuminates each of the photosensitive drums 6 with laser light, the intermediate transfer belt 7, a primary transfer roller 5 as a primary transfer unit, a second transfer roller 8 as a secondary transfer unit, a fixing unit 55, and the like.

The individual process cartridges 3 each include the photosensitive drum 6, and a not-illustrated charger, a development unit, and a cleaner disposed around the photosensitive drum 6. The intermediate transfer belt 7 is stretched around a plurality of stretching rollers, and is disposed adjacent to each of the process cartridges 3 in contact with each of the photosensitive drums 6. When any (a driving roller) of the plurality of stretching rollers connected to a motor (not-illustrated) is rotationally driven, the intermediate transfer belt 7 configured in this manner runs in a direction indicated by an arrow in FIG. 3 thereby. The primary transfer roller 5 is disposed at a position facing each of the photosensitive drums 6 via the intermediate transfer belt 7. Further, the secondary transfer roller 8 is disposed in contact with the intermediate transfer belt 7, and the secondary transfer roller 8 and the intermediate transfer belt 7 form a secondary transfer portion T2, on a downstream side of each of the process cartridges 3 with respect to the direction in which the intermediate transfer belt 7 runs. The exposure unit (not-illustrated) is disposed on an opposite side of each of the process cartridges 3 with respect to the intermediate transfer belt 7, and illuminates each of the photosensitive drums 6 with the laser light based on the information read by the scanner device 108 or information transmitted from outside.

Further, in the present exemplary embodiment, the development unit for each of the process cartridges 3 includes a toner container 12 for replenishing the toner of each of the colors. The fixing unit 55 is disposed downstream of the secondary transfer portion T2, and heats and presses a recording material bearing the toner image thereon to fix the toner image onto the recording material. Further, the printer device 106 includes a plurality of cassettes 356 where sheets are contained, and picks up a sheet from the cassette 356 to convey the sheet to the secondary transfer portion T2 and the fixing unit 55, and then discharges the fixed sheet to a sheet discharge port 313. Further, the printer device 106 also includes a reversing conveyance mechanism that conveys the sheet while reversing it to carry out two-sided printing.

The image forming apparatus 100 configured in this manner performs an image forming process in a following manner.

First, a surface of the photosensitive drum 6 corresponding to each of the colors is charged by the charging device and exposed by the exposure unit (not-illustrated), by which a latent image is formed on the photosensitive drum 6. Each of the latent images is developed by the development unit, by which the toner image is formed on the photosensitive drum 6. The toner image formed on the photosensitive drum 6 reaches a primary transfer portion T1 where the photosensitive drum 6 and the intermediate transfer belt 7 are in abutment with each other. Then, the toner image on the photosensitive drums 6 is sequentially transferred onto the intermediate transfer belt 7 by applying a primary transfer bias to the primary transfer roller 5 at the primary transfer portion T1, by which a full-color toner image is formed on the intermediate transfer belt 7. This toner image is conveyed to the secondary transfer portion T2 by the run of the intermediate transfer belt 7.

On the other hand, the sheet fed from the cassette 356 is conveyed toward the secondary transfer portion T2. More specifically, the sheet is fed out from the cassette 356 by a pickup roller 10 one by one, and is conveyed to the secondary transfer portion T2 after a timing thereof is synchronized with the toner image on the intermediate transfer belt 7 by a registration roller 9. Then, the toner image on the intermediate transfer belt 7 is transferred as a secondary transfer onto the sheet by applying a secondary transfer bias to the secondary transfer roller 8 at the secondary transfer portion T2. After that, the sheet with the toner image transferred thereon is conveyed to the fixing unit 55. The toner is melted and mixed among the colors by receiving the heat and the pressure, by which the toner image is fixed on the sheet as a printed image. The sheet with the image fixed thereon is discharged to the sheet discharge port 313 with a printed surface of the sheet laid face down by a discharge roller 18 provided downstream of the fixing unit 55.

Further, the toner remaining on the surface of the photosensitive drum 6 after the transfer process (transfer residual toner) is removed and collected from the surface of the photosensitive drum 6 by a cleaning device as a cleaning unit. The cleaning device includes a not-illustrated cleaning blade as a cleaning member disposed in contact with the photosensitive drum 6 and a waste toner container 2 for containing the transfer residual toner raked from the surface of the rotating photosensitive drum 6 by the cleaning blade.

Next, when the two-sided printing is carried out, the sheet after the fixing is discharged to the sheet discharge port 313 with the printed surface laid face down, and is conveyed in a switchback manner with use of an internal structure thereof. After that, this sheet is conveyed to a conveyance path 57 for the two-sided printing by a reversing conveyance roller 17, and is fed to the secondary transfer portion T2 again. Then, the image is transferred onto the sheet at the secondary transfer portion T2, and the sheet with the image transferred thereon passes through the fixing unit 55 and is discharged to the sheet discharge port 313 by the discharge roller 18.

A sheet discharge sensor 315, a two-sided conveyance sensor 316, and a pre-registration sensor 317 are used to detect whether the printing sheet is left there. Occurrence of a jam is detected by these sensors. These sensors may be sensors using a mechanical flag or may be sensors using an optical element.

FIGS. 4A and 4B illustrate a moving image list table 400 and a moving image table 410 stored in the storage device 111 illustrated in FIG. 1, respectively. In the present exemplary embodiment, a moving image indicating a series of work contents displayed when occurrence of a maintenance event such as a lack of the toner, waste toner full, and the jam is detected will be referred to as an "event occurrence moving image". Further, a moving image indicating the series of work contents displayed when an instruction to display a maintenance method is received from the user under a situation where the maintenance event has not occurred will be referred to as an "arbitrarily playback moving image".

FIG. 4A illustrates the moving image list table 400. The moving image list table 400 is a table that defines a relationship between the maintenance event such as the lack of the toner, the waste toner full, and the jam, and the moving image that should be played back when the occurrence of this maintenance event is detected. In the moving image list table 400, a maintenance identification (ID) 401 and a moving image list 402 are stored in association with each other. The maintenance ID 401 is identification information for identifying the maintenance event that has occurred in the image forming apparatus 100.

In FIG. 4A, a maintenance ID 001 indicates the waste toner full, and is detected by the printer device 106.

A maintenance ID 002, a maintenance ID 003, a maintenance ID 004, and a maintenance ID 005 indicate a lack of black toner, a lack of yellow toner, a lack of magenta toner, and a lack of cyan toner, respectively. They are also detected by the printer device 106.

Further, maintenance IDs 006 to 011 each indicate a lack of toner of two colors, maintenance IDs 012 to 015 each indicate a lack of toner of three colors, and a maintenance ID 016 is a lack of toner of all the colors. They are also detected by the printer device 106. The "lack of the toner" is not limited to an event in which the toner completely runs out but also includes even an event in which a remaining toner amount falls below a predetermined threshold value.

On the other hand, a maintenance ID 017 indicates a jam at the conveyance portion, and is detected by the sheet discharge sensor 315 or the pre-registration sensor 317. A maintenance ID 018 indicates a jam at the two-sided conveyance portion, and is detected by the two-sided conveyance sensor 316. A maintenance ID 019 indicates combined jams at the conveyance portion and the two-sided conveyance portion, and is detected by any one of the sheet discharge sensor 315 and the pre-registration sensor 317, and the two-sided conveyance sensor 316.

The moving image list 402 indicates a list of moving images that should be played back when each maintenance event has occurred. When the maintenance event has occurred, the series of work contents (maintenance method) required to resolve this corresponding maintenance event should be presented to the user. The series of work contents includes a plurality of work contents, such as work of opening the cover, work of removing jammed paper, and work of closing the cover. In the following description, the moving image for each of the corresponding work contents will be referred to as a "partial moving image". In the moving image list 402, a combination of a plurality of partial moving images, and a playback order of these partial moving images are stored in association with the maintenance ID 401. The combination of the partial moving images refers to, for example, partial moving images A1, A2, and A3 in the case of the waste toner full, which are indicated in the moving image list 402 corresponding thereto. Further, the playback order is an order in which the partial moving images are written, and the partial moving images are supposed to be played back in an order of A1, A2, and A3 in the case of the waste toner full. Similarly, in the case of the lack of the toner or the jam, the plurality of moving images corresponding to the maintenance event that has occurred are supposed to be played back in the order in which they are written in the moving image list 402.

In the present exemplary embodiment, assume that, even under the situation where the maintenance event such as the lack of the toner, the waste toner full, and the jam has not occurred, the user can arbitrarily confirm the work contents for, for example, replacing the toner container, replacing the waste toner container, or clearing the jam. The moving image list table 400 is also used as a table indicating the moving image that should be displayed when the instruction to display the maintenance method is received from the user under the situation where the maintenance event has not occurred.

For example, when an instruction to display the work for replacing the waste toner container is issued from the user, the partial moving images A1, A2, and A3 corresponding to the maintenance ID 001 are played back in order. Further, when an instruction to display the work for replacing the toner container is issued from the user, partial moving images B1, B2, B3, B4, B5, B6, B7, B8, B9, and B10 corresponding to the maintenance ID 016 are played back in order. Further, when an instruction to display the work for clearing the jam is issued from the user, partial moving images C1, C2, C3, and C4 corresponding to the maintenance ID 019 are played back in order.

In the present exemplary embodiment, the arbitrary playback moving image has the following characteristics. In the case of the replacement of the waste toner container, the arbitrary playback moving image matches the moving image played back when the maintenance event (waste toner full) has occurred (maintenance ID is 001). On the other hand, in the case of the replacement of the toner container, the maintenance ID 016 is uniquely selected from among the maintenance IDs 002 to 016 so that the moving image corresponding to the maintenance ID016 is played back as the arbitrary playback moving image. Similarly, in the case of the clearing of the jam, the maintenance ID 019 is uniquely selected from among the maintenance IDs 017 to 019 so that the moving image corresponding to the maintenance ID 019 is played back as the arbitrary playback moving image.

FIG. 4B illustrates the moving image table 410. The moving image table 410 is a table that associates a moving image ID 411, a moving image file 412, a playback duration 413, a cover open/close flag 414, and a message 415 with one another.

The moving image ID 411 is an ID for identifying the partial moving image, and is also used in the moving image list 402 in the above-described moving image list table 400. The moving image file 412 indicates a filename of the partial moving image to be played back and a location of the partial moving image file in the storage device 111. In the present example, the partial moving image file is assumed to be stored in the storage device 111, but the image forming apparatus 100 may be configured to store the partial moving image file in advance in a server connected via a network or an external apparatus such as a storage device connected via a universal serial bus (USB) cable, and read out this partial moving image file when necessary.

The playback duration 413 indicates a playback duration from a start to an end of a playback of this partial moving image.

The cover open/close flag 414 indicates whether this partial moving image is a partial moving image indicating work before the cover of the image forming apparatus 100 is opened or a partial moving image indicating work after the cover of the image forming apparatus 100 is opened. The cover open/close flag 414 set to 0 indicates the partial moving image indicating the work before the cover is opened, and the cover open/close flag 414 set to 1 indicates the partial moving image indicating the work after the cover is opened.

The message 415 indicates a message to be displayed while the corresponding partial moving image is being played back.

Each of the partial moving images indicates the following work content.

The partial moving image A1 indicates a work content of opening the front cover 202. The partial moving image A2 indicates a work content of unloading the waste toner container 2. The partial moving image A3 indicates a work content of loading a new waste toner container and closing the front cover 202.

The partial moving image B1 indicates the work content of opening the front cover 202. The partial moving image B2 indicates a work content of unloading an empty black toner container, and the partial moving image B3 indicates a work content of loading a newt black toner container.

The partial moving image B4 indicates a work content of unloading an empty yellow toner container, and the partial moving image B5 indicates a work content of loading a newt yellow toner container.

The partial moving image B6 indicates a work content of unloading an empty magenta toner container, and the partial moving image B7 indicates a work content of loading a newt magenta toner container.

The partial moving image B8 indicates a work content of unloading an empty cyan toner container, and the partial moving image B9 indicates a work content of loading a new cyan toner container. The partial moving image B10 indicates the work content of closing the front cover 202.

The partial moving image C1 indicates a work content of opening the right cover 201. The partial moving image C2 indicates a work content of removing jammed paper around the sheet discharge sensor 315 and jammed paper around the pre-registration sensor 317. The partial moving image C3 indicates a work content of removing jammed paper around the two-sided conveyance sensor 316. The partial moving image C4 indicates a work content of closing the right cover 201.

Referring back to the moving image list 402 illustrated in FIG. 4A, for example, if the jam at the conveyance portion has occurred (the maintenance ID 401 is 017), first, the partial moving image C1 indicating the work of opening the right cover 201 is played back. Then, subsequently, the partial moving image C2 indicating the work of removing the jammed paper around the sheet discharge sensor 315 and the jammed paper around the pre-registration sensor 317, and the partial moving image C4 indicating the work of closing the right cover 201 are played back in order. Then, the work for resolving the jam at the conveyance portion, which is the maintenance event, is indicated in the partial moving image C2, and the partial moving image C1 can be said to indicate the work content for preparation therefore. In the following description, the partial moving image indicating the work content that should be performed before the work of actually resolving the maintenance event is performed will be referred to as an "advance preparation moving image". Further, the partial moving image indicating the work for resolving the maintenance event, i.e., the work to be performed after the work indicated in the advance preparation moving image is performed will be referred to as a "main moving image". For example, if the maintenance ID 401 is 001, the partial moving image A1 serves as the advance preparation moving image, and the partial moving images A2 and A3 serve as the main moving image. If the maintenance ID 401 is 002, the partial moving image B1 serves as the advance preparation moving image, and the partial moving images B2, B3, and B10 serve as the main moving image. Further, if the maintenance ID 401 is 017, the partial moving image C1 serves as the advance preparation moving image, and the partial moving images C2 and C4 serve as the main moving image. In the present exemplary embodiment, the partial moving image having the cover open/close flag 414 set to 0 serves as the advance preparation moving image, and the partial moving image having the cover open/close flag 414 set to 1 serves as the main moving image.

FIGS. 5A to 7D each illustrate an example of a screen displayed on the display device 115 according to the present exemplary embodiment. In the following description, an overview of transitions of the display screen according to the present exemplary embodiment will be described with reference to FIGS. 5A to 7D. The CPU 101 generates display data by executing the program stored in the storage device 111, to display the screens illustrated in FIGS. 5A to 7D on the display device 115 via the display control unit 114.

<Display Procedure for Event Occurrence Moving Image>

Figure 5A:
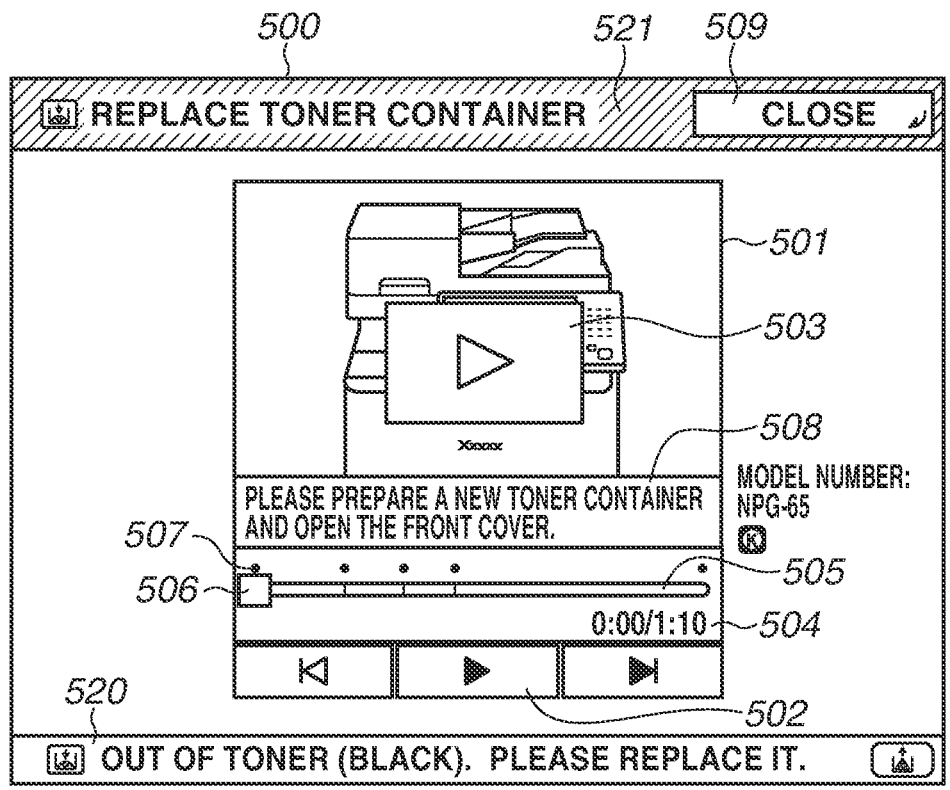
FIGS. 5A to 5H are diagrams each illustrating an example of a screen on a display device according to a first exemplary embodiment.

FIG. 5A illustrates an example of a maintenance screen displayed first when the occurrence of the maintenance event is detected. Here, this screen will be described, supposing that the occurrence of the lack of the black toner is detected (the maintenance ID is 002) by way of example. When the maintenance ID is 002, the partial moving images having the moving image IDs B1, B2, B3, and B10, respectively, are supposed to be played back in order according to the moving image list table 400. In FIG. 5A, a screen in a state stopped at the beginning of the partial moving image B1, which is the advance preparation moving image, is displayed.

Items displayed on a maintenance screen 500 include a moving image display region 501, a playback button 502, a playback mark 503, a playback time/duration display label 504, a bar 505, a slider 506, a chapter 507, a message region 508, and a close button 509. Further, the items displayed on the maintenance screen 500 include a status display region 520 and a title display region 521.

The moving image display region 501 is a region for displaying the event occurrence moving image. The playback button 502 is a button for instructing the image forming apparatus 100 to play back the moving image. The playback mark 503 is a mark for instructing the image forming apparatus 100 to play back the moving image, similarly to the playback button 502. If the playback button 502 or the playback mark 503 is pressed (touched), the CPU 101 starts the playback of the moving image.

The playback time/duration display label 504 is an item indicating a sum of the playback durations of the plurality of partial moving images to be played back (referred to as a "total playback duration"), and a time corresponding to a current playback position with respect thereto.

The bar 505 and the slider 506 form a seek bar for indicating the playback position in the entire moving image and also allowing the user to instruct the image forming apparatus 100 to move the playback position. The bar 505 schematically illustrates the total playback duration. The slider 506 indicates the current playback position, and is also used to instruct the image forming apparatus 100 to move the playback position. The slider 506 moves within a range of the bar 505 according to a playback state of the moving image. Further, the playback position can be moved to an arbitrary position by dragging (moving) the slider 506. Further, when an arbitrary position along the bar 505 is pressed, the playback of the moving image can be advanced to this position, and the slider 506 also moves according to this playback position. The chapter 507 indicates a position at which the moving image is chaptered.

The playback time/duration display label 504 and the chapter 507 will be described specifically. If the maintenance ID is "002", the partial moving images B1, B2, B3, and B10 are supposed to be played back in order according to the moving image list table 400. The playback durations of these partial moving images B1, B2, B3, and B10 are 13 seconds (00:13), 10 seconds (00:10), 30 seconds (00:30), and 17 seconds (00:17), respectively, according to the moving image table 410. The total playback duration is the sum of the playback durations of the partial moving images to be played back, and therefore is 1 minute and 10 seconds (01:10) in this case. On the other hand, the playback time indicates the current playback position with respect to the total playback duration. For example, suppose that the image forming apparatus 100 is displaying a scene after 5 seconds (00:05) have passed from the beginning of the partial moving image B1, which is the first partial moving image to be played back. In this case, the display of 5 seconds indicates the playback time. On the other hand, suppose that the image forming apparatus 100 is displaying a scene after 10 seconds have passed from the beginning of the partial moving image B2, which is the second partial moving image to be played back. In this case, since the playback of the partial moving image B1 has been ended, the playback time is figured out to be 23 seconds (00:23) by adding the playback duration of the partial moving image B1, which is 13 seconds, and the time period for which the partial moving image B2 has been already played back, which is 10 seconds. The playback time/duration display label 504 displays the playback time and the total playback duration calculated in this manner as a character string formed by connecting them with a slash (/).

Further, the chapter 507 is displayed at the position where the moving image is chaptered in the series of work contents. The chapter 507 is displayed at three positions, i.e., points where the playback of the partial moving image is switched (between B1 and B2, between B2 and B3, and between B3 and B10). Further, the chapter 507 may also be displayed at two positions, i.e., at the beginning and the end of the entire moving image. FIG. 5A illustrates an example in a case where the chapter 507 is displayed at five positions.

A message complementing the content of the partial moving image being played back is displayed in the message display region 508. More specifically, when the partial moving image B1 is being played back, "please prepare a new toner container and open the right cover" is displayed based on the message 415 in the moving image table 410. The message display region 508 may be hidden after a predetermined time period has passed since the start of the playback of the corresponding partial moving image or may be kept displayed as long as the corresponding partial moving image is being displayed. The close button 509 is a button for ending the display of the displayed maintenance screen 500.

The status display region 520 is a region for displaying the message corresponding to the maintenance event that has occurred in the image forming apparatus 100. Occurrence of a plurality of maintenance events leads to alternating displays of the messages corresponding to the maintenance events in the status display region 520. In FIG. 5A, "out of toner (black). please replace it", which is the message corresponding to the lack of the black toner, is displayed.

The title display region 521 is a region for displaying a title of the displayed maintenance method.

Figure 5B:
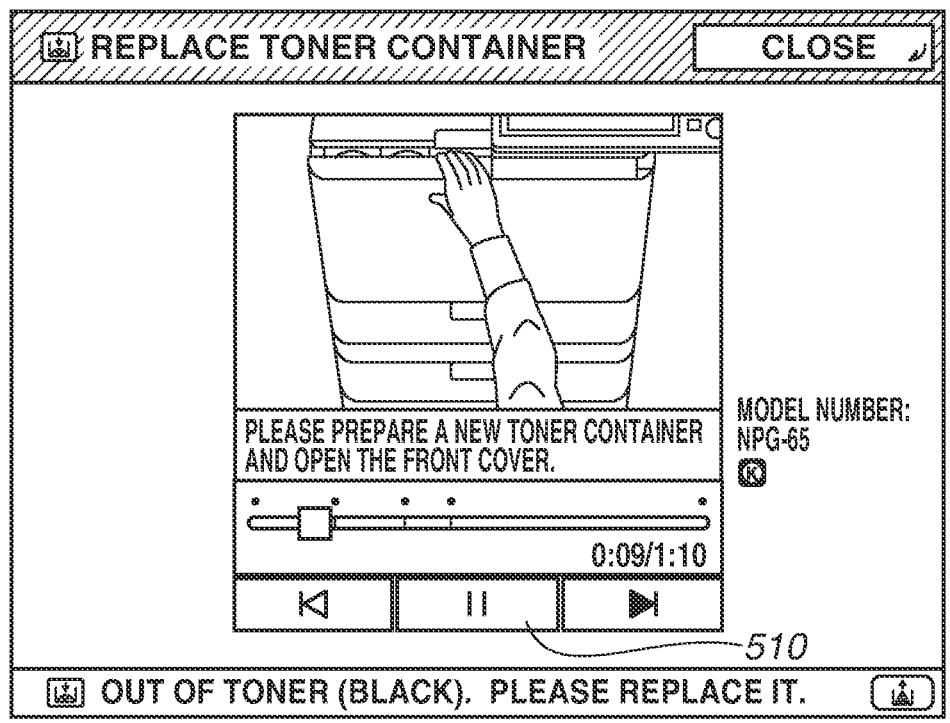

If the playback button 502 or the playback mark 503 is pressed on the screen 500 illustrated in FIG. 5A, the playback of the moving image is started. If the maintenance ID is 002, the CPU 101 starts the playback of the partial moving image B1, which is the advance preparation moving image. FIG. 5B illustrates an example of a screen after 9 seconds have passed since the start of the playback of the partial moving image B1. The playback button 502 and the playback mark 503 are hidden according to the start of the playback of the moving image, and a pause button 510 is displayed in replacement of the playback button 502 at the same position.

Figure 5C:
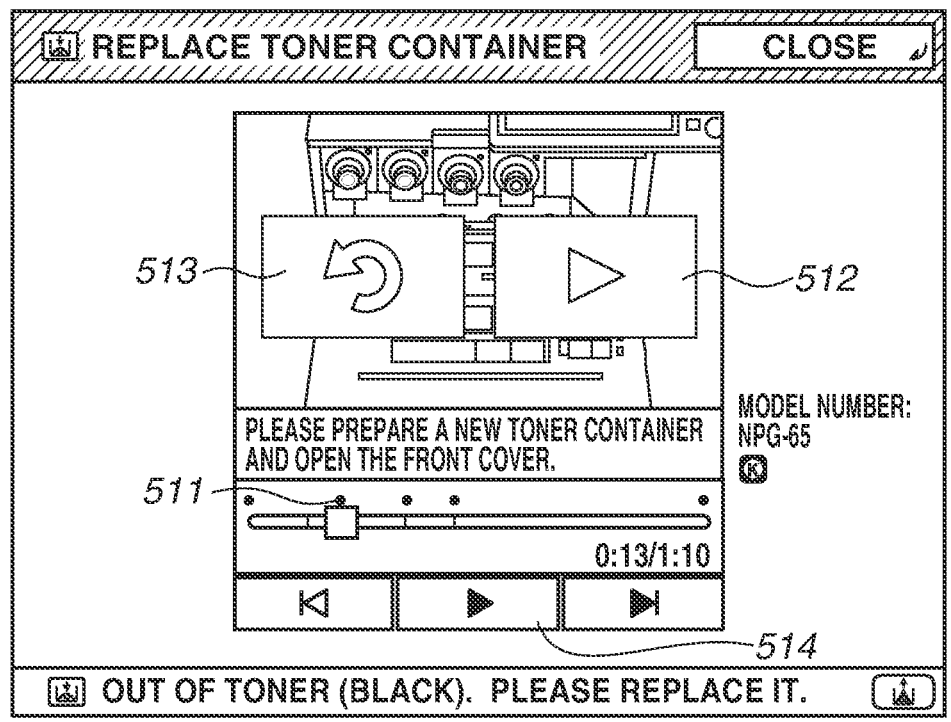

FIG. 5C illustrates an example of a screen when the playback position reaches to the end of the partial moving image B1. The playback of the moving image is automatically paused at a time point that the playback of the partial moving image B1 is ended, i.e., at a position where a chapter 511 is placed. Then, a replay mark 513 is displayed together with a playback mark 512. Further, the pause button 510 is hidden, and a playback button 514 is displayed at the same position. The replay mark 513 is a mark for instructing the image forming apparatus 100 to play back the currently stopped partial moving image from the beginning thereof. More specifically, if the replay mark 513 is pressed while the moving image is stopped at the position where the chapter 511 is placed, the CPU 101 moves to the beginning of the partial moving image B1 and restarts the playback of the moving image therefrom.

Figure 5D:
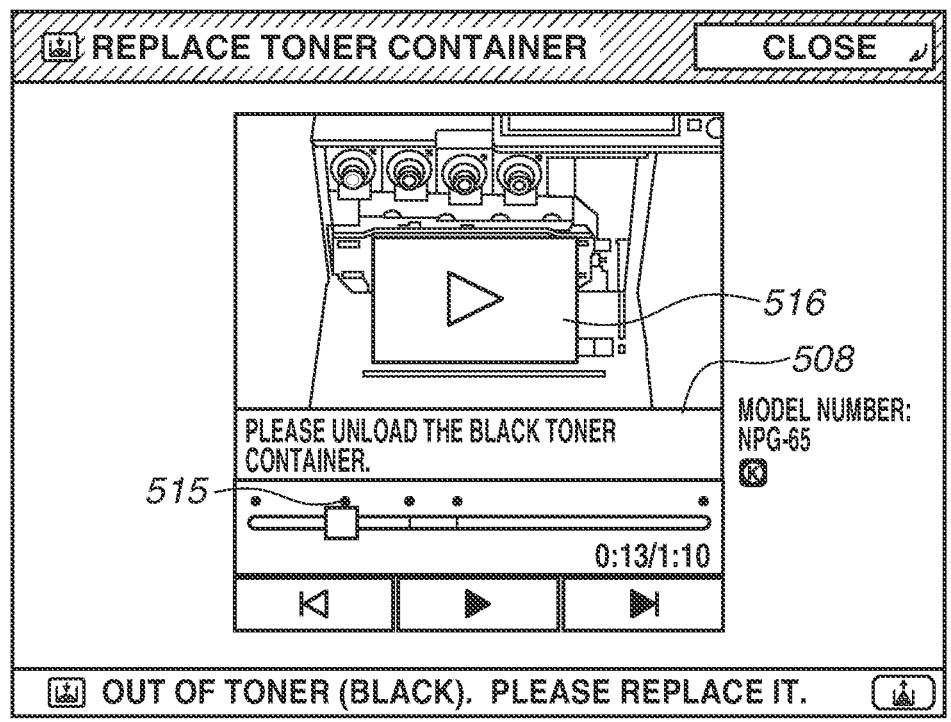

FIG. 5D illustrates an example of a screen displayed when opening of the front cover 202 is detected while the partial moving image B1 is being played back. When the opening of the front cover 202 is detected, the CPU 101 automatically ends the playback of the partial moving image B1, and displays a screen in a state stopped at the beginning (chapter 515) of B2, which is the first partial moving image in the main moving image. In this case, only a playback mark 516 is displayed. Displaying only the playback mark 516 can prompt the user to view a moving image of work that the user should engage next. "Please unload the black toner container", which is the message corresponding to the partial moving image B2, is displayed in the message region 508. If the front cover 202 has been already opened, the replay mark 513 is not displayed because the partial moving image B1 does not have to be played back again.

In this manner, in the procedure for displaying the event occurrence moving image, the playback automatically proceeds (skips) to the main moving image when the work indicated in the advance preparation moving image is completed, so that the user can proceed to the next work at ease.

Figure 5E:
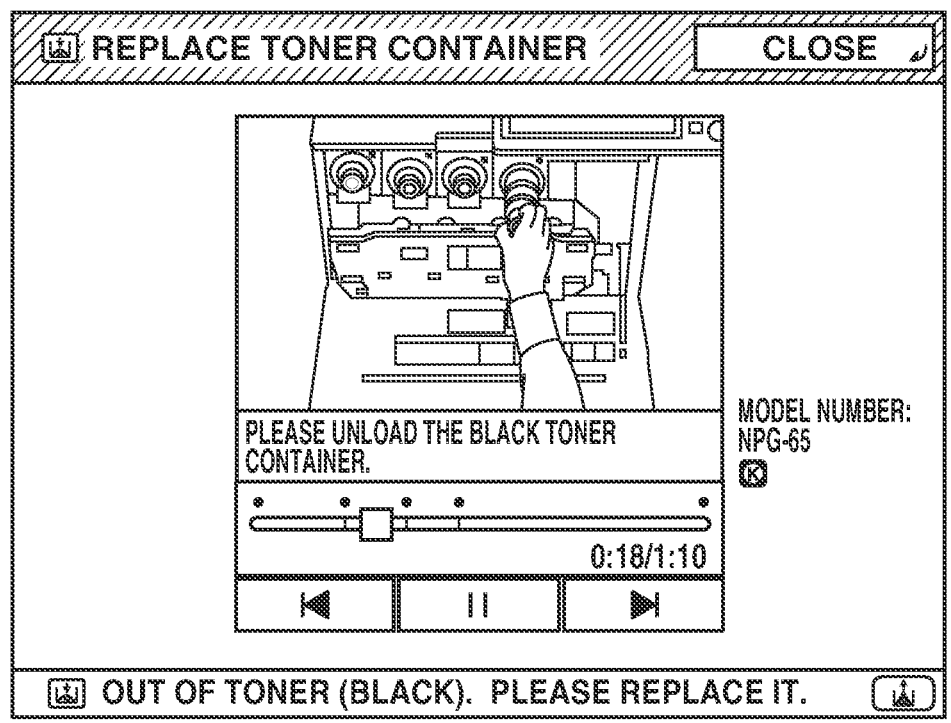

If the playback mark 512 or 516, or the playback button 514 is pressed on the screen illustrated in FIG. 5C or 5D, the playback of the partial moving image B2 is started. FIG. 5E illustrates an example of a screen after 5 seconds have passed since the start of the playback of the partial moving image B2.

Figure 5F:
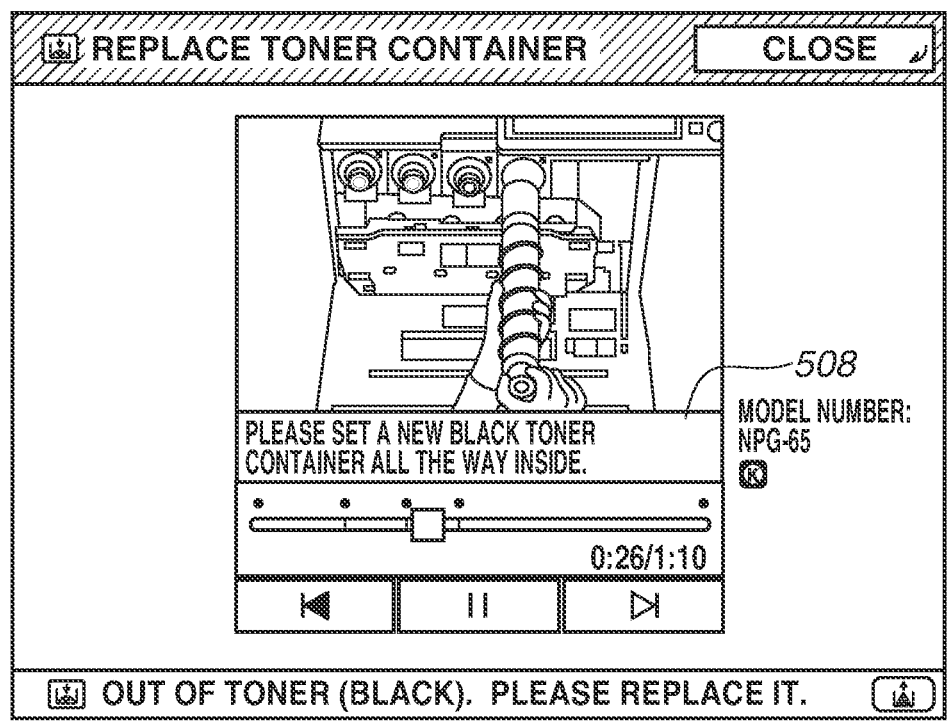

FIG. 5F illustrates an example of a screen after 3 seconds have passed since the start of the playback of the partial moving image B3. In the screen illustrated in FIG. 5F, "please set the new black toner container all the way inside", which is a message corresponding to the partial moving image B3, is displayed in the message region 508.

Figure 5G:
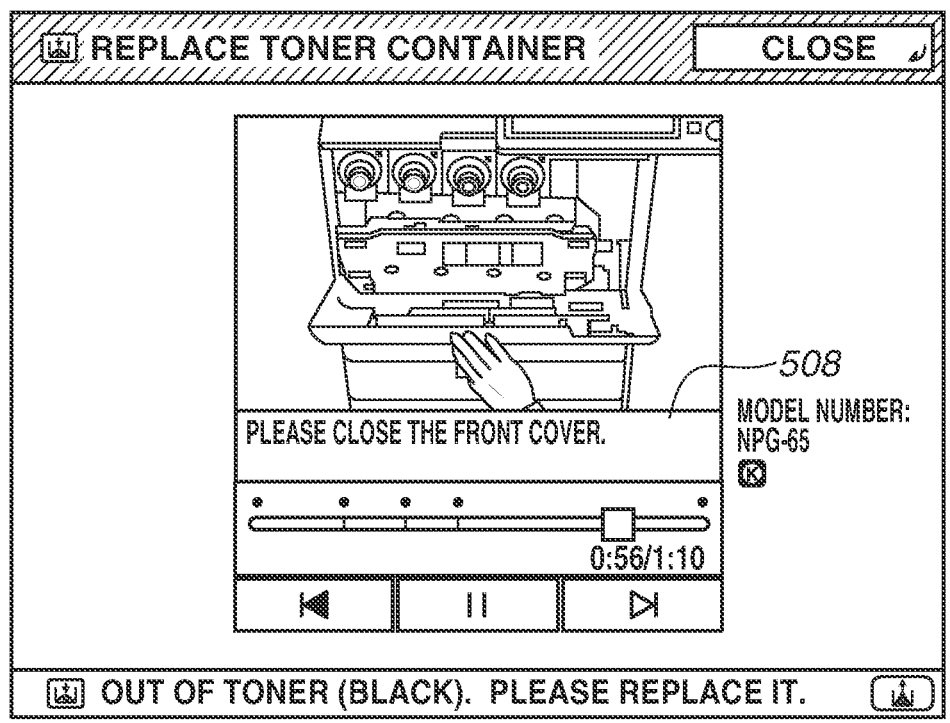

FIG. 5G illustrates an example of a screen after 3 seconds have passed since the start of the playback of the partial moving image B10. In the screen illustrated in FIG. 5G, "please close the front cover", which is a message corresponding to the partial moving image B10, is displayed in the message region 508.

Figure 5H:
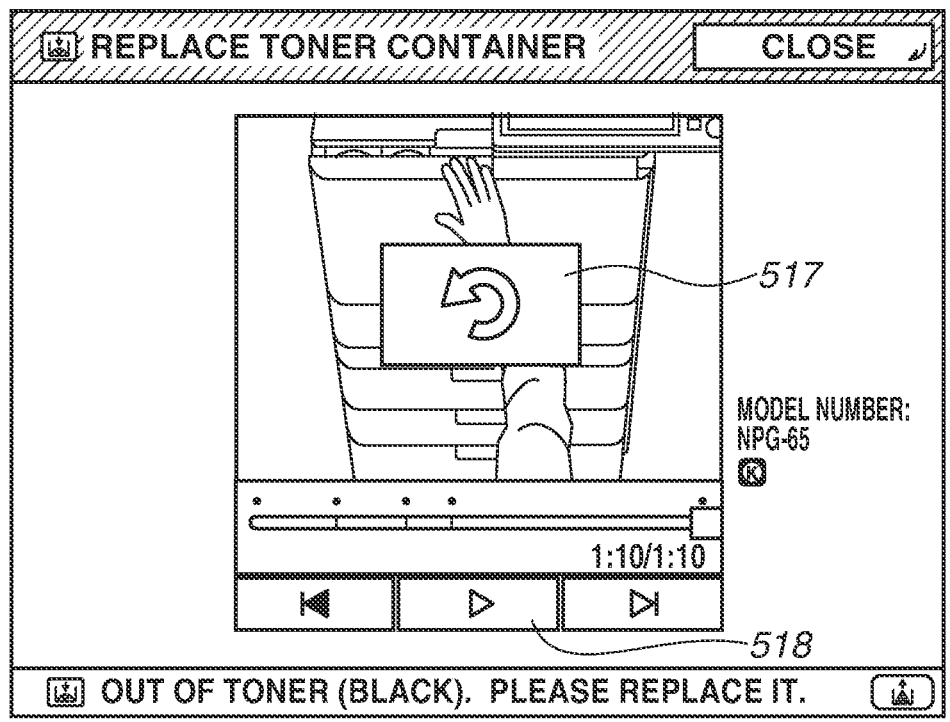

FIG. 5H illustrates an example of a screen when the playback position reaches to the end of the entire moving image (the end of the partial moving image B10 in a case where the maintenance ID is 002). In this case, there is no partial moving image to be displayed next, so that only a replay mark 517 is displayed and the playback mark is not displayed. Further, a playback button 518 is displayed in a gray-out manner to indicate that this button is inoperable.

In this manner, the screen different from the screen displayed when the playback is paused halfway is displayed at the time of the completion, to the end, of the playback of the plurality of partial moving images corresponding to the maintenance event that has occurred, so that the user can be aware that the moving image is played back to the end.

Figure 6A:
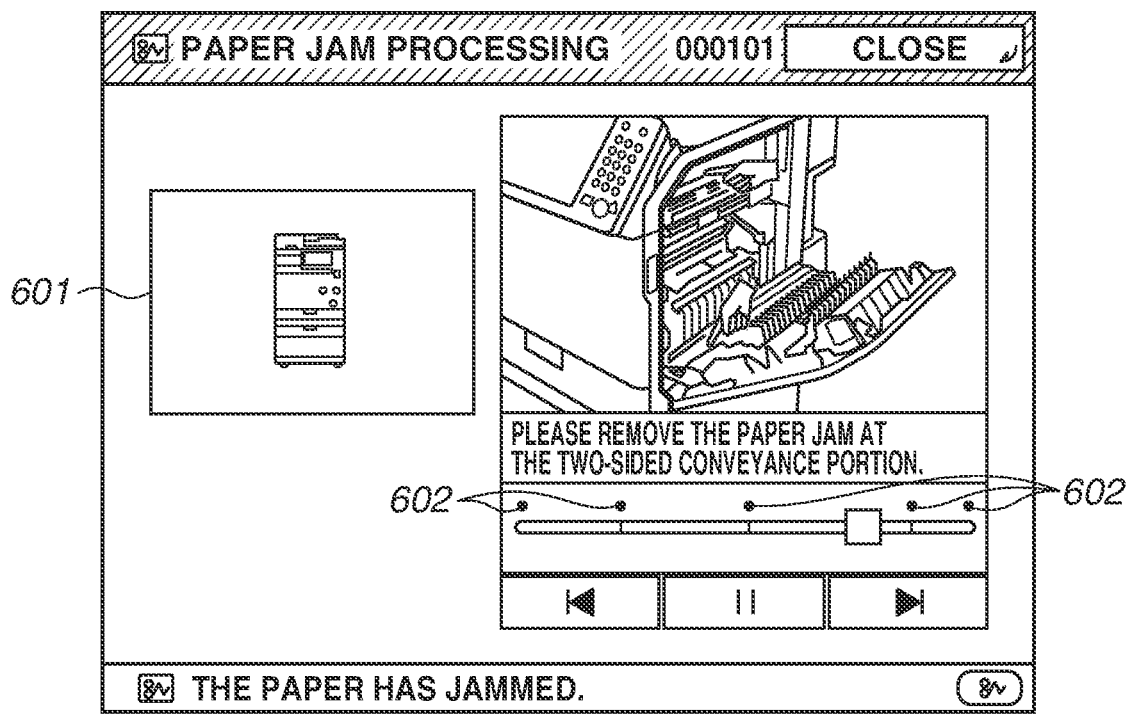
FIGS. 6A and 6B are diagrams each illustrating an example of a screen on the display device according to the first exemplary embodiment.

FIG. 6A illustrates a screen when the occurrence of the combined jams at the conveyance portion and the two-sided conveyance portion is detected (the maintenance ID is 019) and the corresponding moving image is being played back.

An icon 601 indicates a location where the jam has occurred in the image forming apparatus 100. More specifically, when the maintenance ID is 019, the combined jams at the conveyance portion and the two-sided conveyance portion have occurred, and therefore the icon 601 indicates that the jams have occurred at the conveyance portion and the two-sided conveyance portion. When the maintenance ID is 019, the partial moving images having the moving image IDs C1, C2, C3, and C4, respectively, are supposed to be played back in order according to the moving image list table 400. Further, a chapter 602 is displayed at the beginning and the end of the moving image, and the position at which each of the partial moving images is switched. FIG. 6A illustrates an example of a screen when the playback of the partial moving image C2, which indicates the work of removing the jammed paper around the sheet discharge sensor 315 and the jammed paper around the pre-registration sensor 317, has been ended, and the partial moving image C3, which indicates the work of removing the jammed paper around the two-sided conveyance sensor 316, is being played back. Further, assume that the user has completed the removal of the jammed paper around the sheet discharge sensor 315 or the jammed paper around the pre-registration sensor 317 according to the procedure indicated in the partial moving image C2.

Figure 6B:
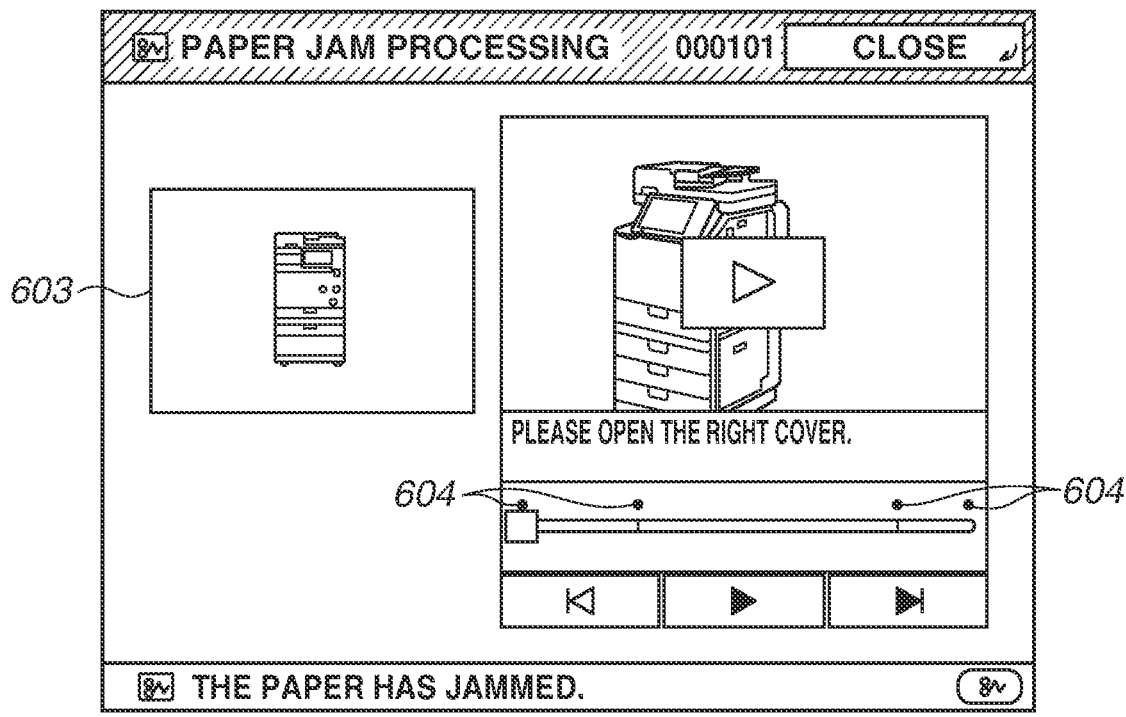

FIG. 6B illustrates an example of a screen displayed when closing of the right cover 201 is detected while the screen illustrated in FIG. 6A is being displayed. In this case, the jam at the two-sided conveyance portion is not yet resolved while the jam at the conveyance portion has been resolved, so that the CPU 101 updates the maintenance ID and switches the display to the playback of the moving image corresponding to the jam at the two-sided conveyance portion (the maintenance ID is 018). More specifically, when the maintenance ID is 018, the partial moving images having the moving image IDs C1, C3, and C4, respectively, are supposed to be played back in order according to the moving image list table 400. Therefore, the CPU 101 displays a screen in a state stopped at the beginning of the partial moving image C1. Further, displays of an icon 603 and a chapter 604 are also updated.

In this manner, in the procedure for displaying the event occurrence moving image, at the moment that the closing of the cover is detected, the maintenance event that has occurred in the image forming apparatus 100 is reconfirmed and the moving image to be played back is also updated along therewith. Therefore, when the plurality of maintenance events, such as the jam at the conveyance portion and the jam at the two-sided conveyance portion, has occurred, and the user performs the work for resolving them, the user can confirm to what extent the work has been completed without a problem by closing the cover.

<Display Procedure for Arbitrary Playback Moving Image>

FIGS. 7A, 7B, 7C, and 7D each illustrate an example of a screen displayed when the user confirms the series of work contents required to resolve the maintenance event by the moving image under the situation where the maintenance event has not occurred. Here, the displayed screen will be described, by way of example, supposing that the user issues the instruction to confirm the work contents for, for example, replacing the toner container, replacing the waste toner container, or clearing the jam, under the situation where the maintenance event such as the lack of the toner, the waste toner full, and the jam has not occurred.

First, the user causes a maintenance method confirmation screen 700 to be displayed on the display device 115 by operating the input device 113. The maintenance method confirmation screen 700 is a selection screen for selecting the maintenance method that the user wants to confirm among the maintenance methods respectively corresponding to the plurality of kinds of maintenance events.

Figure 7A:
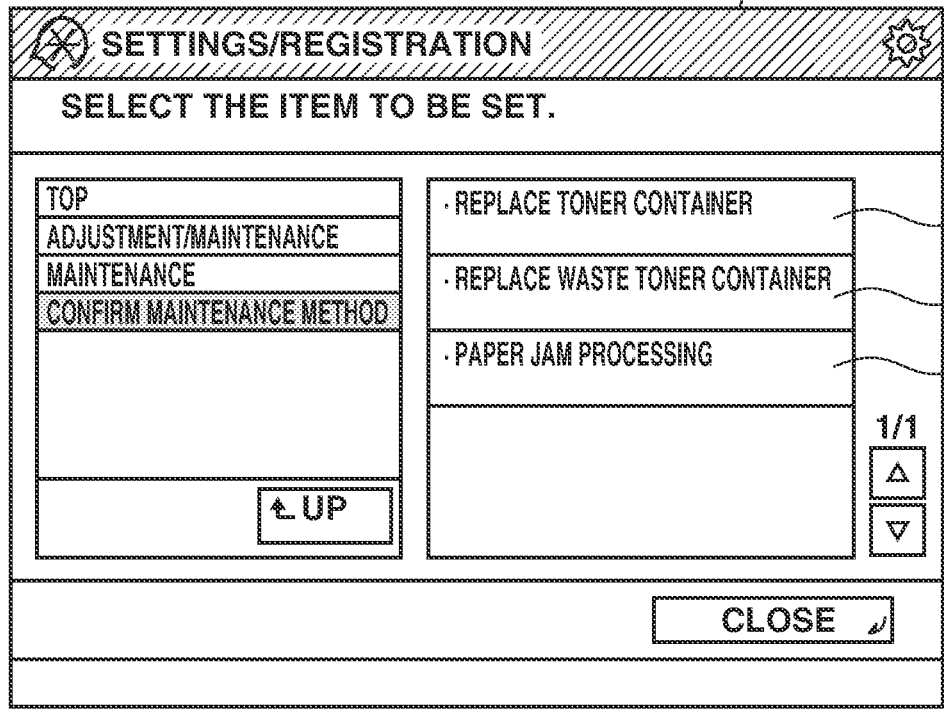
FIGS. 7A, 7B, 7C, and 7D are diagrams each illustrating an example of a screen on the display device according to the first exemplary embodiment.
Figure 7B:
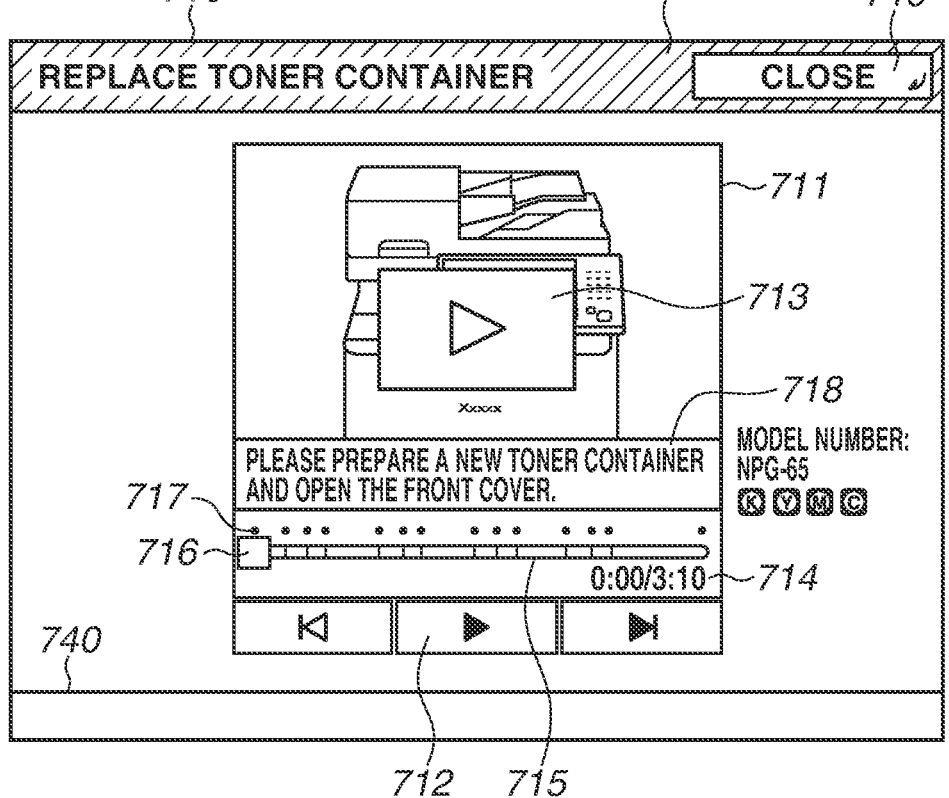

If a "replace toner container" menu 701 is selected in FIG. 7A, a maintenance screen 710 containing the moving image indicating the work contents corresponding to the replacement of the toner container is displayed as illustrated in FIG. 7B.

Items displayed on the maintenance screen 710 include a moving image display region 711, a playback button 712, a playback mark 713, a playback time/duration display label 714, a bar 715, a slider 716, a chapter 717, a message region 718, a close button 719, and a status display region 740. The moving image display region 711 is a region for displaying the arbitrary playback moving image. As illustrated in FIG. 7B, the message corresponding to the maintenance event is not displayed in the status display region 740 under the situation where the maintenance event has not occurred.

Similarly to the event occurrence moving image described with reference to FIGS. 5A to 5H, if the playback button 712 or the playback mark 713 is pressed, the playback of the moving image is started, and the playback button 712 and the playback mark 713 are hidden while a pause button is displayed in replacement of the playback button 712 at the same position. Then, when the partial moving image is played back to the end, the playback of the moving image is paused and a replay mark is displayed together with the playback mark 713.

While the arbitrary playback moving image is being displayed, the display is not automatically switched to the main moving image even when the corresponding cover (the front cover 202 in the case of the replacement of the toner container) is opened. This is because the arbitrary playback moving image is intended to be displayed for the purpose of presenting the overview of the maintenance work to the user, and does not require the display to be switched to the moving image indicating the next work in synchronization with the user's work.

Now, comparing the maintenance screen 500 illustrated in FIG. 5A and the maintenance screen 710 illustrated in FIG. 7B, the title display region 521 on the maintenance screen 500 and the title display region 741 on the maintenance screen 710 are different in color from each other. While the title display region 521 on the maintenance screen 500 is expressed in orange strongly calling attention, the title display region 741 on the maintenance screen 710 is expressed in gray mildly calling attention. In the drawings, the difference in color is indicated by using differently shaded patterns.

In this manner, even when the moving image played back in the moving image display region 501 and the moving image played back in the moving image display region 711 are the same moving image, the user can distinguish whether the event occurrence moving image is being displayed or the arbitrary playback moving image is being displayed based on the difference in color between the title display regions 521 and 741. Another method may be used as long as this method realizes such a display manner that the event occurrence moving image and the arbitrary playback moving image can be distinguished from each other. For example, colors of characters displayed in the title display regions 521 and 741 may be different from each other, or different colors may be used as colors of backgrounds of the moving image display regions 501 and 711. The image forming apparatus 100 may also be configured to combine these methods in any manner.

In a case of the replacement of the toner container (the maintenance ID is 016), the partial moving images having the moving image IDs B1, B2, B3, B4, B5, B6, B7, B8, B9, and B10, respectively, are supposed to be played back in order according to the moving image list table 400. In FIG. 7B, a screen in a state stopped at the beginning of the partial moving image B1, which is the advance preparation moving image, is displayed. If a close button 719 is pressed on the screen 710 illustrated in FIG. 7B, the display of the maintenance screen 710 is ended.

Figure 7C:
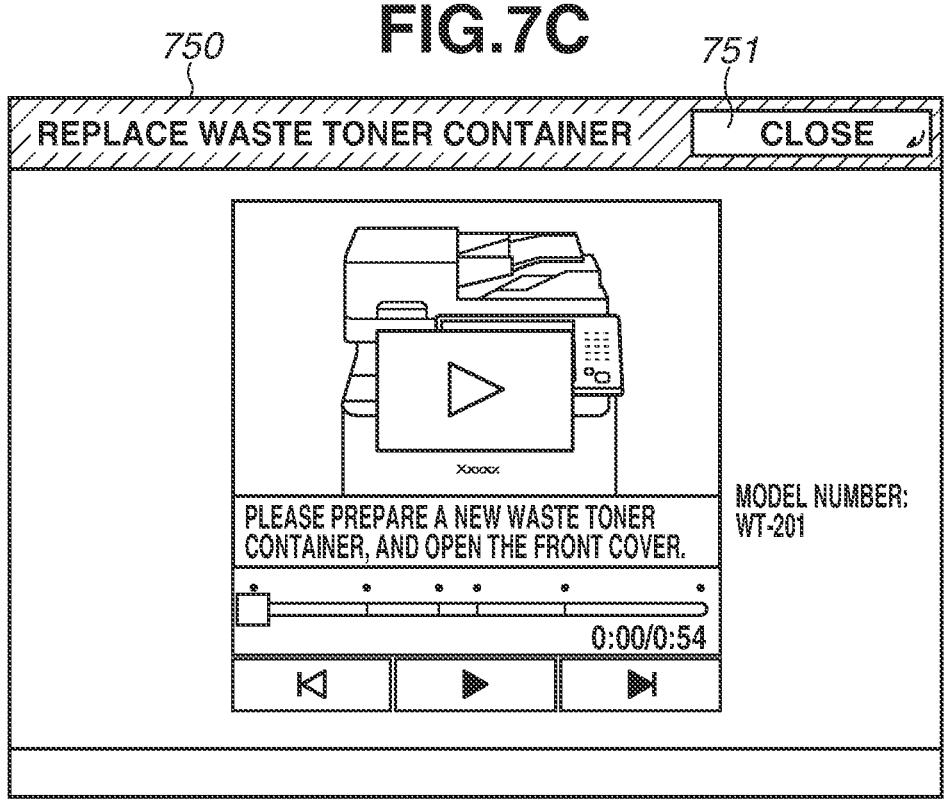

Further, if a "replace waste toner container" menu 702 is selected in FIG. 7A, a maintenance screen 750 presenting the moving image indicating the work contents corresponding to the replacement of the waste toner container is displayed as illustrated in FIG. 7C. In a case of the replacement of the waste toner container (the maintenance ID is 001), the partial moving images having the moving image IDs A1, A2, and A3, respectively, are supposed to be played back in order according to the moving image list table 400. In FIG. 7C, a screen in a state stopped at the beginning of the partial moving image A1, which is the advance preparation moving image, is displayed. If a close button 751 is pressed on the screen 750 illustrated in FIG. 7C, the display of the maintenance screen 750 is ended.

Figure 7D:

Further, if a "paper jam processing" menu 703 is selected in FIG. 7A, a maintenance screen 760 containing the moving image indicating the work contents corresponding to the clearing of the jam is displayed as illustrated in FIG. 7D. In a case of the clearing of the jam (the maintenance ID is 019), the partial moving images having the moving image IDs C1, C2, C3, and C4, respectively, are supposed to be played back in order according to the moving image list table 400. In FIG. 7D, a screen in a state stopped at the beginning of the partial moving image C1, which is the advance preparation moving image, is displayed. If a close button 761 is pressed on the screen 760 illustrated in FIG. 7D, the display of the maintenance screen 760 is ended. In this manner, in the display procedure for displaying the arbitrary playback moving image, the user can arbitrarily confirm the work contents for, for example, replacing the toner container, replacing the waste toner container, or clearing the jam, by the moving image even under the situation where the maintenance event has not occurred.

Next, processing for displaying the moving image indicating the maintenance method will be described with reference to FIG. 8. The CPU 101 executes the program stored in the storage device 111, thereby performing each step illustrated in a flowchart of FIG. 8.

Figure 8:
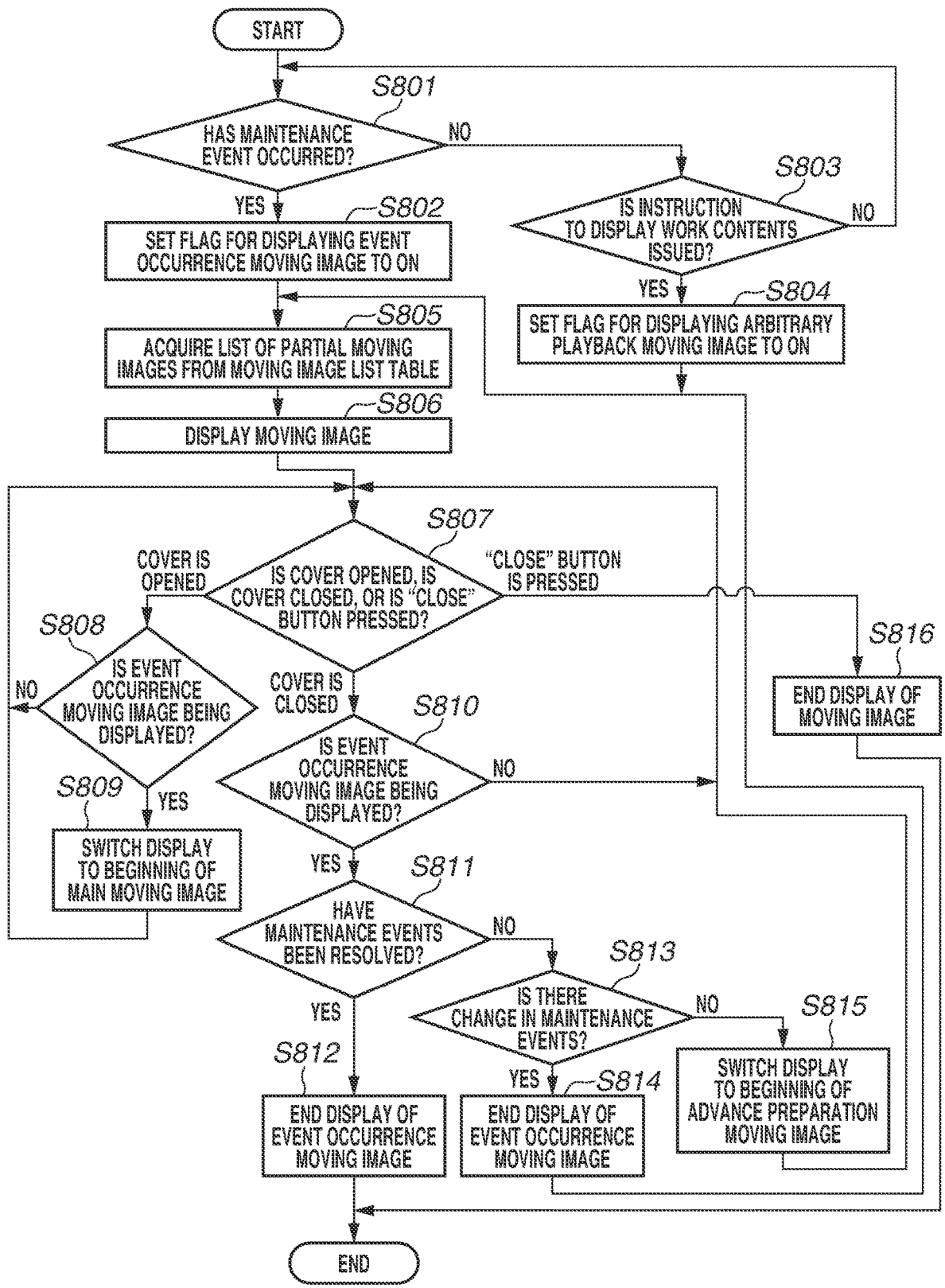
FIG. 8 is a flowchart illustrating processing for displaying the moving image indicating a maintenance method according to the first exemplary embodiment.

FIG. 8 is a flowchart illustrating the processing for displaying the moving image indicating the maintenance method according to the present exemplary embodiment. The CPU 101 executes the program stored in the storage device 111, by which the processing illustrated in this flowchart is realized.

First, in step S801, the CPU 101 determines whether the maintenance event such as the lack of the toner, the waste toner full, and the occurrence of the jam. The lack of the toner and the waste toner full are detected by the printer device 106, and the jam is detected by the sheet discharge sensor 315, the two-sided conveyance sensor 316, and the pre-registration sensor 317. Then, the CPU 101 identifies the maintenance ID for indicating the detected maintenance event. For example, if the lack of the black toner has occurred, the CPU 101 identifies 002 as the maintenance ID.

In step S801, if the CPU 101 determines that some maintenance event has occurred (YES in step S801), the processing proceeds to step S802.

In step S802, the CPU 101 sets a flag for displaying the event occurrence moving image to ON. On the other hand, in step S801, if the CPU 101 determines that any maintenance event has not occurred (NO in step S801), the processing proceeds to step S803.

In step S803, the CPU 101 determines whether the instruction to display the work contents for, for example, replacing the toner container, replacing the waste toner container, or clearing the jam is issued. For example, the CPU 101 determines whether any of the "replace toner container" menu 701, the "replace waste toner container" menu 702, and the "paper jam processing" menu 703 is selected on the maintenance method confirmation screen 700 illustrated in FIG. 7A. The CPU 101 identifies the maintenance ID corresponding to the selected menu. For example, if the "replace toner container" menu 701 is selected, the CPU 101 identifies 016 as the maintenance ID.

In step S803, if the CPU 101 determines that the instruction to display some work contents is issued (YES in step S803), the processing proceeds to step S804.

In step S804, the CPU 101 sets a flag for displaying the arbitrary playback moving image to ON. On the other hand, in step S803, if no instruction to display any work contents is issued (NO in step S803), the processing returns to step S801.

Next, in step S805, the CPU 101 refers to the moving image list table 400, and acquires the list of partial moving images corresponding to the maintenance ID identified in step S801 or S803. For example, if the identified maintenance ID is 002, the partial moving images to be played back are B1, B2, B3, and B10. The CPU 101 temporarily stores the plurality of identified partial moving images in the RAM 104 in advance in the playback order thereof as, for example, array information.

Then, in step S806, the CPU 101 reads the partial moving image corresponding to the first moving image ID into the RAM 104, and outputs this partial moving image to the display device 115 in the stopped state. At this time, the CPU 101 controls whether to display the partial moving image as the event occurrence moving image or display the partial moving image as the arbitrary playback moving image based on a content of the display flag set in step S802 or S804. As described above, the color of the title display region is different between the event occurrence moving image and the arbitrary playback moving image. For example, if the maintenance ID is 002 and the flag for displaying the event occurrence moving image is set to ON, the CPU 101 reads the partial moving image B1, which is the advance preparation moving image, into the RAM 104, and outputs the partial moving image B1 to the display device 115 in the stopped state. The screen 500 illustrated in FIG. 5A is displayed on the display device 115 in this manner. On the other hand, if the maintenance ID is 016 and the flag for displaying the arbitrary playback moving image is set to ON, the CPU 101 reads the partial moving image B1, which is the advance preparation moving image, into the RAM 104, and outputs the partial moving image B1 to the display device 115 in the stopped state. The screen 710 illustrated in FIG. 7B is displayed on the display device 115 in this manner. After that, the playback of the moving image is started according to the operation of starting the playback by the user as described with reference to FIGS. 5A to 7D.

In step S807, the CPU 101 determines whether the cover corresponding to the displayed moving image is opened, this cover is closed, or the "close" button is pressed. For example, if the lack of the black toner (the maintenance ID is 002) has occurred, the moving image therefore includes the partial moving image B1 indicating the work content of opening the front cover 202. Therefore, the CPU 101 determines whether the front cover 202 is opened (switched from the closed state to the opened state) or the front cover 202 is closed (switched form the opened state to the closed state) based on a result of the detection by the sensor for the front cover 202. If the CPU 101 determines that the corresponding cover is opened at this time (COVER IS OPENED in step S807), the processing proceeds to step S808.

In step S808, the CPU 101 determines whether the event occurrence moving image is being displayed or the arbitrary playback moving image is being displayed based on the content of the display flag set in step S802 or S804. If the event occurrence moving image is being displayed (YES in step S808), the CPU 101 reads the first partial moving image indicating the work content after the cover is opened into the RAM 104 based on the cover open/close flag 414 in the moving image table 410, and the processing proceeds to step S809. In step S809, the CPU 101 switches the display to the beginning of the main moving image by outputting the read partial moving image to the display device 115 in the stopped state. For example, if the maintenance ID is 002, the beginning of the main moving image, i.e., the first partial moving image having the cover open/close flag 414 set to 1 is B2. The screen illustrated in FIG. 5D is displayed on the display device 115 in this manner. According to this processing, the processing for automatically switching the display to the beginning of the main moving image is supposed to be performed even when the opening of the corresponding cover is detected while the main moving image is being played back. For example, if the maintenance ID is 002, the CPU 101 switches the display to the screen illustrated in FIG. 5D when detecting that the front cover 202 is opened while the partial moving image B3, which is the main moving image, is being played back. With this operation, the image forming apparatus 100 can indicate the work that should be performed next, thereby preventing the user from missing the work content, even when the user inappropriately advances the display to the main moving image before opening the cover.

In step S808, if the arbitrary playback moving image is being displayed (NO in step S808), the processing returns to step S807 without the display automatically switched to the beginning of the main moving image.

Next, in step S807, if the CPU 101 determines that the currently opened cover is closed (COVER IS CLOSED in step S807), the processing proceeds to step S810. In step S810, the CPU 101 determines whether the event occurrence moving image is being displayed or the arbitrary playback moving image is being displayed based on the content of the display flag set in step S802 or S804. If the event occurrence moving image is being displayed (YES in step S810), the processing proceeds to step S811. In step S811, the CPU 101 determines whether all of the maintenance events have been resolved. For example, if the combined jams at the conveyance portion and the two-sided conveyance portion have occurred, and the right cover 201 is closed while the moving image corresponding thereto is being played back, the CPU 101 determines whether the combined jams have been resolved with use of the sheet discharge sensor 315, the two-sided conveyance sensor 316, and the pre-registration sensor 317.

In step S811, if the CPU 101 determines that all of the maintenance events have been resolved (YES in step S811), the processing proceeds to step S812. In step S812, the CPU 101 ends the display of the event occurrence moving image and also sets the flag for displaying the event occurrence moving image to OFF. In this manner, the processing for displaying the event occurrence moving image is ended.

On the other hand, in step S811, if the CPU 101 determines that not all of the maintenance events have been resolved (NO in step S811), the processing proceeds to step S813, in which the CPU 101 determines whether there is any change in the maintenance events that have occurred. For example, if the combined jams at the conveyance portion and the two-sided conveyance portion have occurred, the CPU 101 determines whether any one of the jam at the conveyance portion and the jam at the two-sided conveyance portion has been resolved, with use of the sheet discharge sensor 315, the two-sided conveyance sensor 316, and the pre-registration sensor 317.

In step S813, if the CPU 101 determines that there is some change in the maintenance events that have occurred (YES in step S813), the processing proceeds to step S814. In step S814, the CPU 101 ends the display of the event occurrence moving image. Then, the processing returns to step S805. For example, if the combined jams have occurred, and then the right cover 201 is closed after the jammed paper around the sheet discharge sensor 315 and the jammed paper around the pre-registration sensor 317 is removed while the moving image is being played back, the CPU 101 determines that the event is changed to the jam at the two-sided conveyance portion, and identifies 018 as the maintenance ID. When the identified maintenance ID is 018, the partial moving images to be played back are C1, C3, and C4. Then, the CPU 101 reads the partial moving image C1, which is the advance preparation moving image, into the RAM 104, and outputs the partial moving image C1 to the display device 115 in the stopped state. The display is switched from the screen illustrated in FIG. 6A to the screen illustrated in FIG. 6B in this manner.

On the other hand, in step S813, if the CPU 101 determines that there is no change in the maintenance events that have occurred (NO in step S813), the processing proceeds to step S815. In step S815, the CPU 101 switches the display to the beginning of the advance preparation moving image. Then, the processing returns to step S807.

In step S807, if the CPU 101 determines that the "close" button is pressed ("CLOSE" BUTTON IS PRESSED in step S807), the processing proceeds to step S816. In step S816, the CPU 101 ends the display of the moving image displayed until then. Further, the CPU 101 sets the flag for displaying the event occurrence moving image to OFF if the event occurrence moving image has been displayed, and sets the flag for displaying the arbitrary playback moving image to OFF if the arbitrary playback moving image has been displayed. The processing for displaying the moving image is ended in this manner.

As described above, according to the present exemplary embodiment, the user can confirm the work contents for, for example, replacing the toner container, replacing the waste toner container, or clearing the jam by the moving image at a desired timing even under the situation where the maintenance event such as the lack of the toner and the jam has not occurred. Thus, the image forming apparatus 100 allows the user to confirm the series of work contents required to resolve the maintenance event in advance even when the maintenance event has not occurred, thereby enabling improving the usability of the image forming apparatus 100. Further, when the arbitrary playback moving image is displayed, the different color is used as the color of the title display region from the event occurrence moving image, so that the user can easily distinguish whether the currently displayed moving image is the event occurrence moving image or the arbitrary playback moving image.

Next, a second exemplary embodiment for implementing the present invention will be described, focusing on differences from the first exemplary embodiment. In the second exemplary embodiment, processing performed when a job is input from outside and the maintenance event such as the lack of the toner has occurred while the arbitrary playback moving image is being displayed, will be described.

FIGS. 9A to 9F each illustrate an example of a screen displayed on the display device 115 according to the present exemplary embodiment. In the following description, an overview of transitions of the display screen according to the present exemplary embodiment will be described with reference to FIGS. 9A to 9F. The CPU 101 generates display data by executing the program stored in the storage device 111, and the screens illustrated in FIGS. 9A to 9F are displayed on the display device 115 via the display control unit 114. In the present exemplary embodiment, the screen transition will be described, supposing that the user issues the instruction to display the work for replacing the toner container and the maintenance event that is the lack of the black toner has occurred while the corresponding moving image is being displayed, by way of example.

Figure 9A:
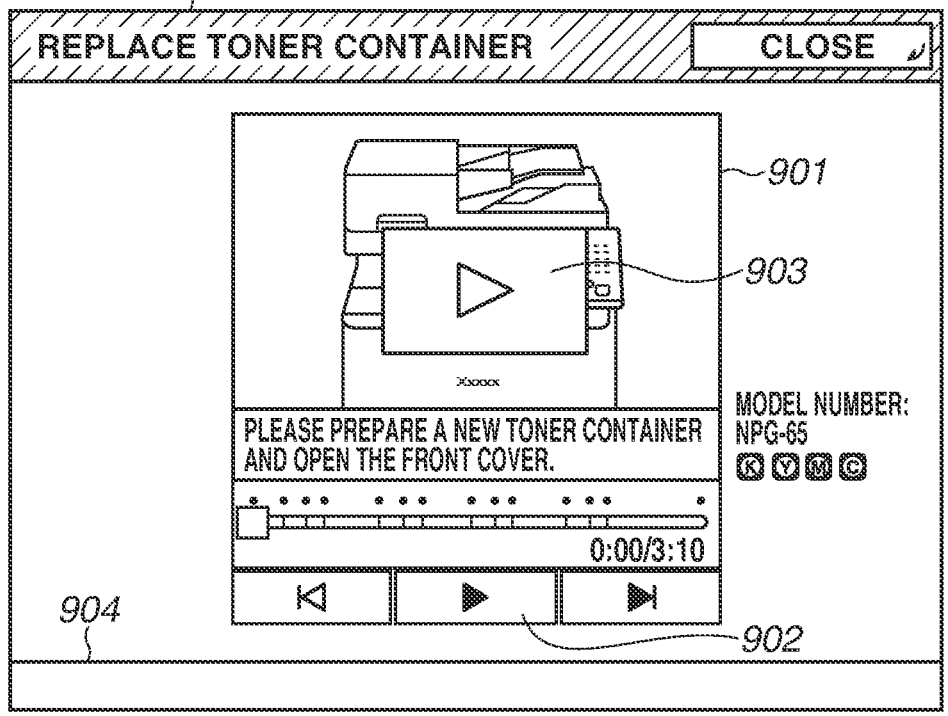
FIGS. 9A to 9F are diagrams each illustrating an example of a screen on a display device according to a second exemplary embodiment of the present invention.

FIG. 9A illustrates an example of a maintenance screen displayed first when the "replace toner container" menu 701 is selected on the maintenance method confirmation screen 700 illustrated in FIG. 7A. In the case of the replacement of the toner container (the maintenance ID is 016), the partial moving images having the moving image IDs B1, B2, B3, B4, B5, B6, B7, B8, B9, and B10, respectively, are supposed to be played back in order according to the moving image list table 400. In FIG. 9A, a screen 900 in a state stopped at the beginning of the partial moving image B1, which is the advance preparation moving image, is displayed. Items displayed on the maintenance screen 900 include a moving image display region 901 for displaying the arbitrary playback moving image, a playback button 902, a playback mark 903, and a status display region 904. However, as illustrated in FIG. 9A, the message corresponding to the maintenance event is not displayed in the status display region 904 under the situation where the maintenance event has not occurred.

Figure 9B:
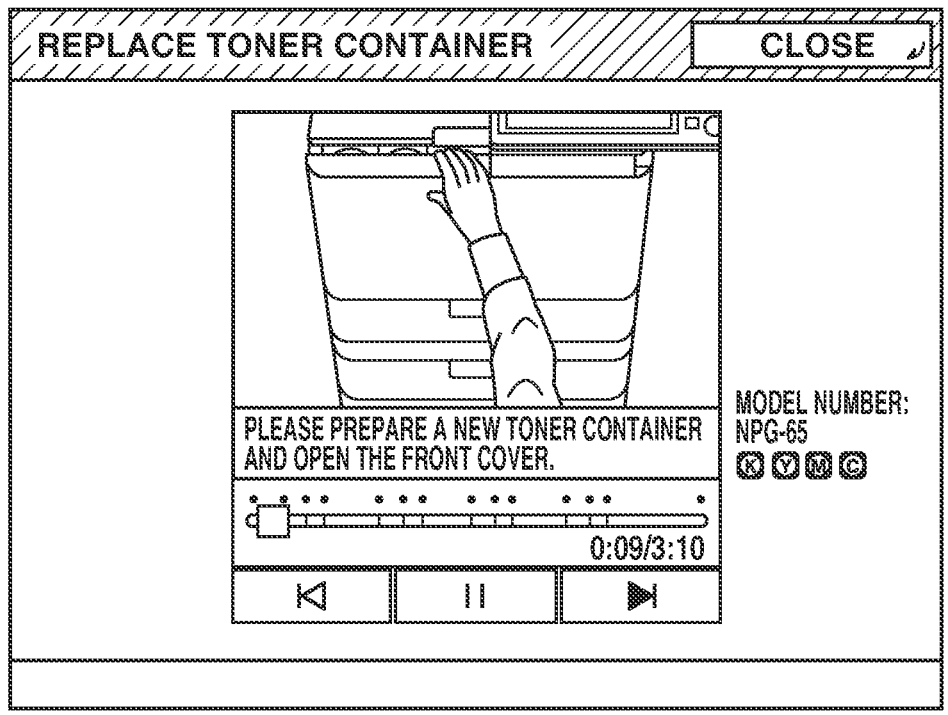

If the playback button 902 or the playback mark 903 is pressed on the screen 900 illustrated in FIG. 9A, the playback of the arbitrary playback moving image is started. When the maintenance ID is 016, the CPU 101 starts the playback of the partial moving image B1, which is the advance preparation moving image. FIG. 9B illustrates an example of a screen after 9 seconds have passed since the start of the playback of the partial moving image B1.

Figure 9C:
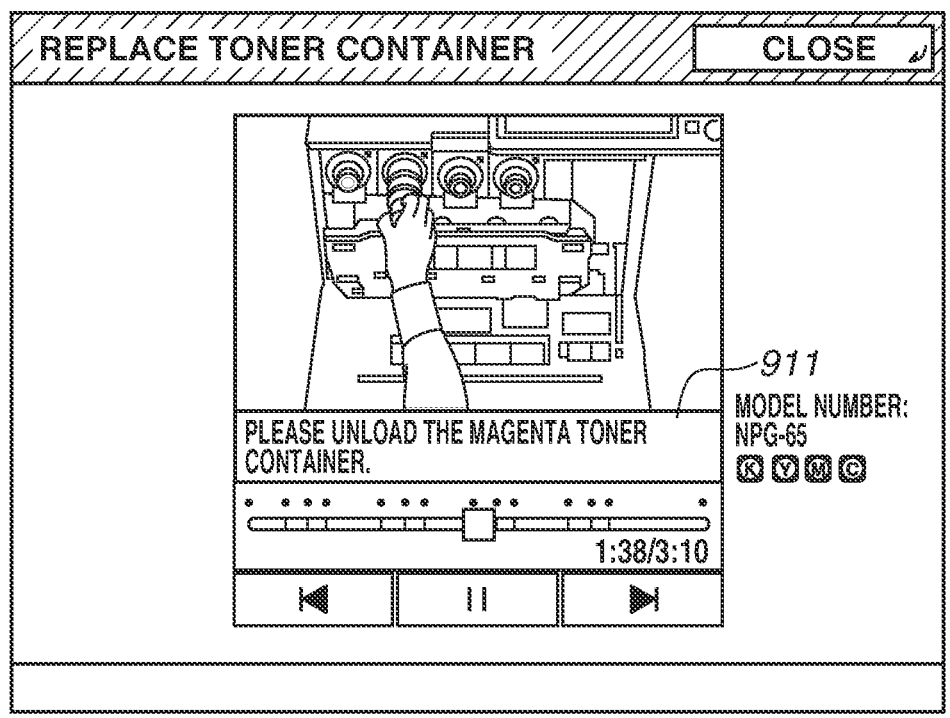

FIG. 9C illustrates an example of a screen after 8 seconds have passed since the start of the playback of the partial moving image B6. "Please unload the magenta toner container", which is the message corresponding to the partial moving image B6, is displayed in a message region 911 on the screen illustrated in FIG. 9C.

Figure 9D:
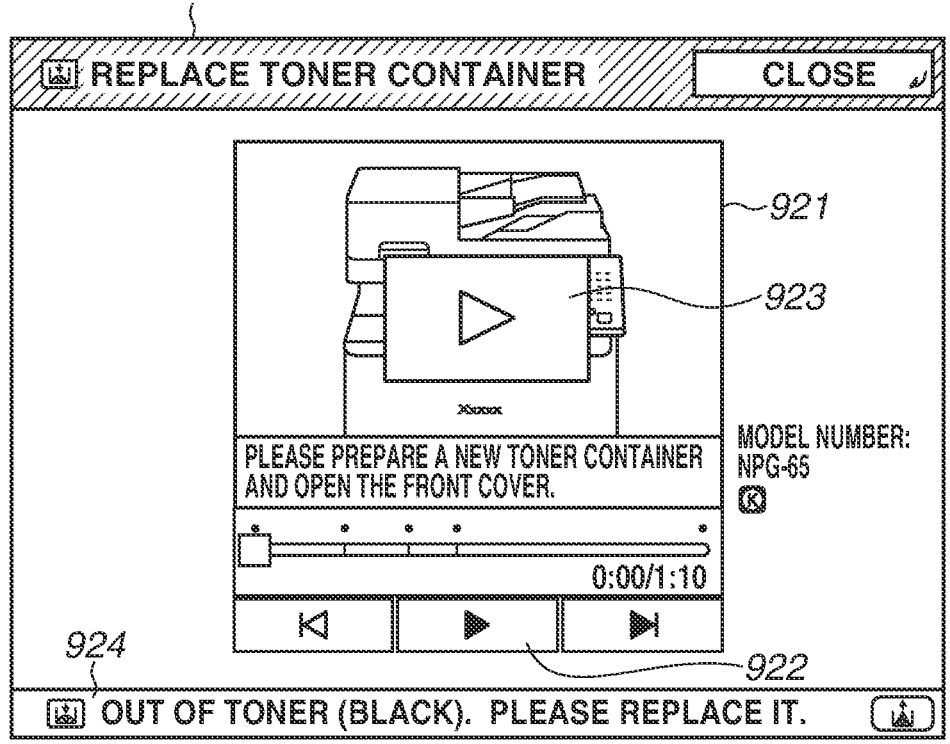

FIG. 9D illustrates an example of a maintenance screen displayed when the occurrence of the lack of the black toner is detected while the partial moving image B6 is being played back. When the occurrence of the maintenance event is detected, the display of the arbitrary playback moving image is automatically ended, and a screen 920 in a state stopped at the beginning of B1, which is the first partial moving image in the event occurrence moving image, is preferentially displayed on the display device 115. Items displayed on the maintenance screen 920 include a moving image display region 921 for displaying the event occurrence moving image, a playback button 922, a playback mark 923, and a status display region 924. In FIG. 9D, "out of toner (black). please replace it", which is the message corresponding to the lack of the black toner, is displayed in the status display region 924.

Figure 9E:
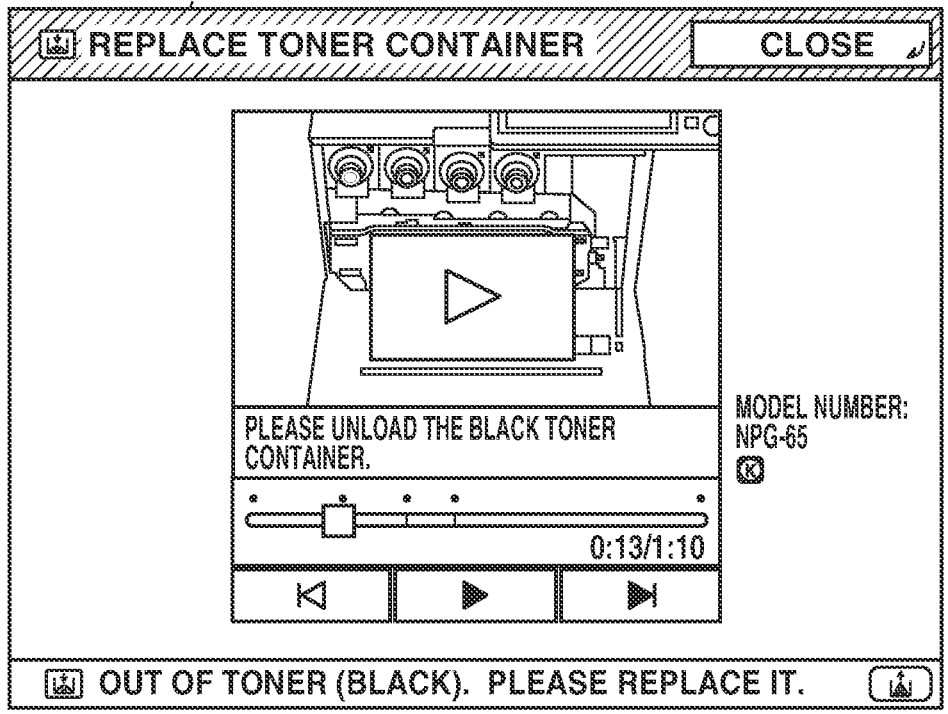

FIG. 9E illustrates an example of a maintenance screen displayed when the opening of the front cover 202 is detected while the event occurrence moving image is being played back. When the opening of the front cover 202 is detected, a screen 930 in a state stopped at the beginning of B2, which is the first partial moving image in the main moving image, is displayed.

Figure 9F:
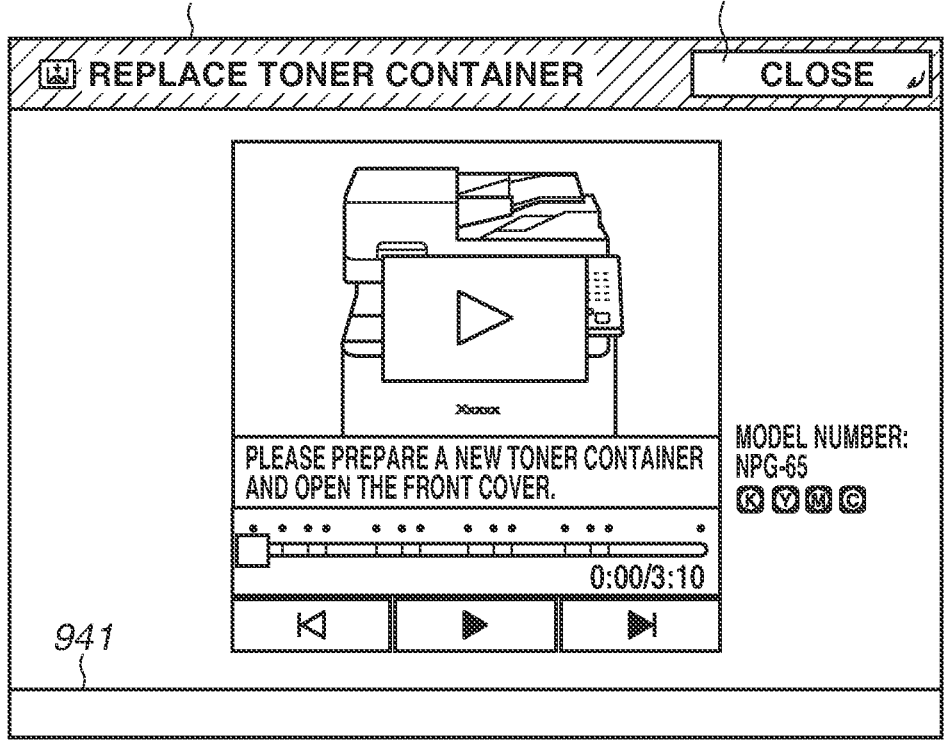

FIG. 9F illustrates an example of a maintenance screen displayed when the resolution of the lack of the black toner is detected after the user performs the work of replacing the black toner container. When the resolution of the maintenance event is detected, the arbitrary playback moving image, which had been displayed before the display has been switched to the display of the event occurrence moving image, is displayed again. As illustrated in FIG. 9F, the message corresponding to the maintenance event is not displayed in the status display region 941 since the maintenance event has been resolved.

Further, at this time, a screen 940 in a state stopped at the beginning of B1, which is the first partial moving image, is displayed. In other words, even if the arbitrary playback moving image had been played back halfway before the display has been switched to the event occurrence moving image as illustrated in FIG. 9C, the moving image is played back from the beginning when the arbitrary playback moving image is displayed again. If a "close" button 942 is pressed, the display of the maintenance screen 940 is ended.

Figure 10:
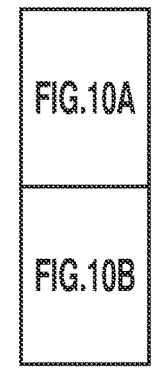
FIG. 10 (consisting of FIGS. 10A and 10B) is a flowchart illustrating processing for displaying a moving image indicating a maintenance method according to the second exemplary embodiment of the present invention.
Figure 10A:
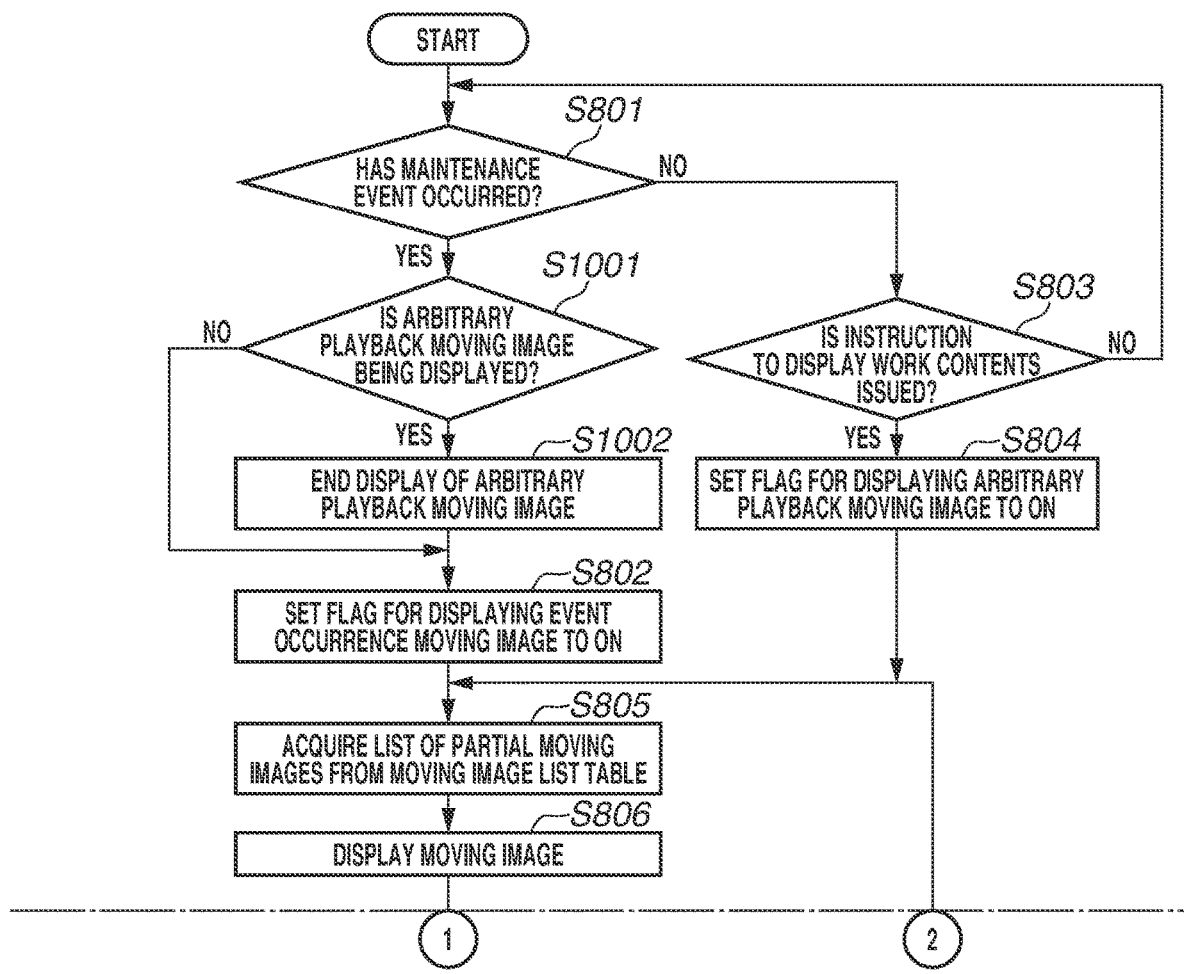
Figure 10B:
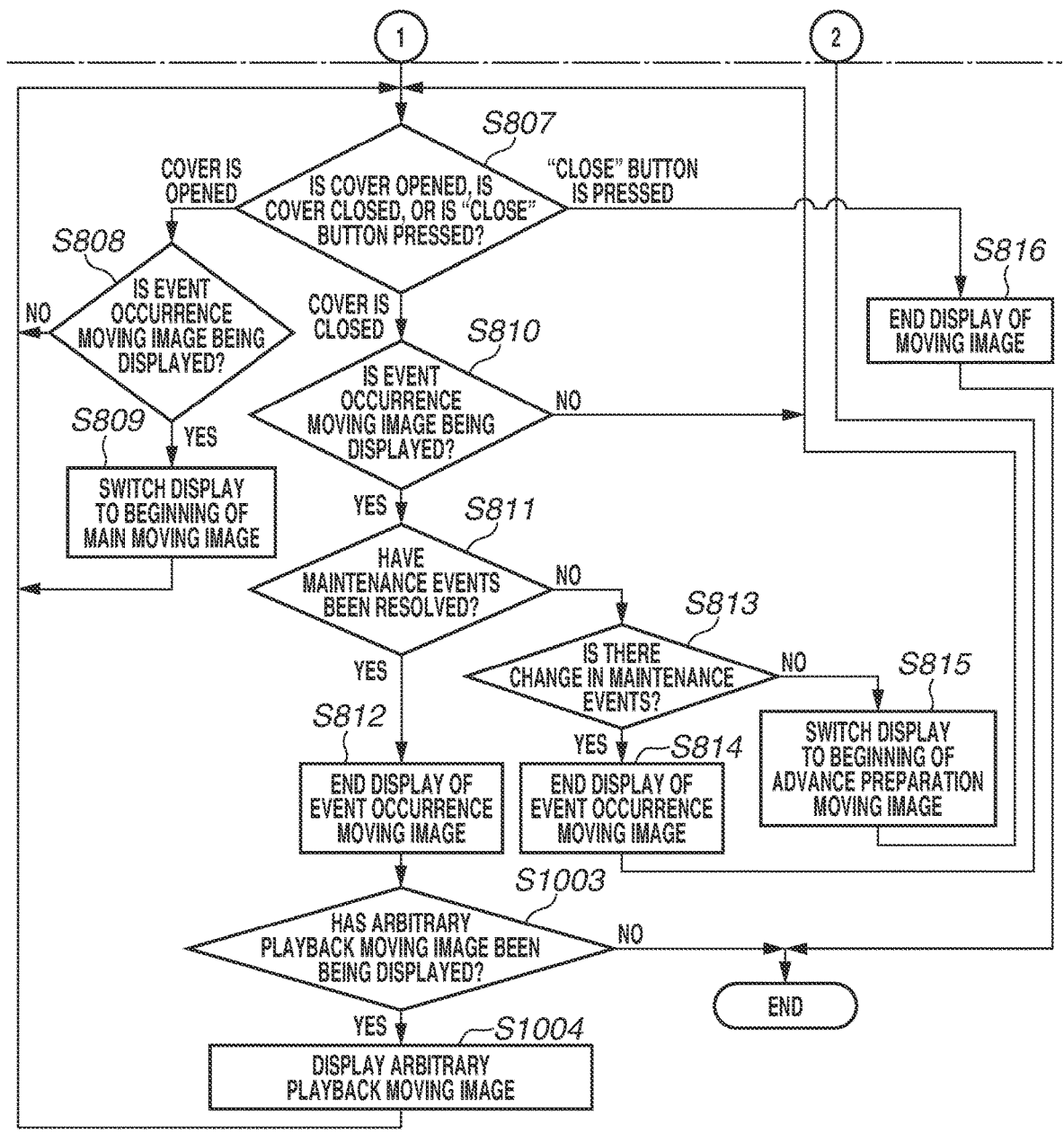

Next, processing for displaying the moving image indicating the maintenance method according to the present exemplary embodiment will be described with reference to FIG. 10 (consisting of FIGS. 10A and 10B). The CPU 101 executes the program stored in the storage device 111, thereby performing each step illustrated in a flowchart of FIG. 10. Similar processes to the processes illustrated in FIG. 8 that have been described in the first exemplary embodiment will be omitted from the description by being indicated by the same step numbers. In FIG. 10, processes of steps S1001 to S1004 are newly added.

In step S801, if the occurrence of the maintenance even is detected (YES in step S801), the processing proceeds to step S1001. In step S1001, the CPU 101 determines whether the arbitrary playback moving image is being displayed. More specifically, the CPU 101 determines whether the flag for displaying the arbitrary playback moving image is set to ON. If the arbitrary playback moving image is being displayed (YES in step S1001), the processing proceeds to step S1002. In step S1002, the CPU 101 ends the display of this arbitrary playback moving image and also sets the flag for displaying the arbitrary playback moving image to OFF. Then, the processing proceeds to step S802 and the steps subsequent thereto. Through this flow, the processing for displaying the event occurrence moving image indicating the series of work contents required to resolve the maintenance event that has occurred is performed. When the display of the arbitrary playback moving image is ended in step S1002, information indicating that the arbitrary playback moving image has been displayed is stored into the RAM 104 in advance.

After the CPU 101 determines that the maintenance events have been resolved in step S811 (YES in step S811) and ends the display of the event occurrence moving image in step S812, in step S1003, the CPU 101 determines whether the arbitrary playback moving image had been displayed immediately before the event occurrence moving image has been displayed. At this time, the CPU 101 makes the determination based on the information stored in the RAM 104 in advance in step S1002. If the arbitrary playback moving image had been displayed (YES in step S1003), the processing proceeds to step S1004. In step S1004, the CPU 101 displays this arbitrary playback moving image again. After the arbitrary playback moving image is displayed again, the processing returns to step S807.

As described above, according to the present exemplary embodiment, when the job is input from outside and the maintenance event has occurred while the arbitrary playback moving image is being displayed on the display device 115, the event occurrence moving image is displayed in preference to the arbitrary playback moving image. As a result, the user can be aware of the occurrence of the maintenance event, thereby recovering the state of the image forming apparatus 100 immediately.

Next, a third exemplary embodiment for implementing the present invention will be described, focusing on differences from the second exemplary embodiment. In the second exemplary embodiment, the example in which the event occurrence moving image is always displayed in preference to the arbitrary playback moving image when the job is input from outside and the maintenance event has occurred while the arbitrary playback moving image is being played back. However, the user may want to continue the playback of the arbitrary playback moving image played back halfway even when the maintenance event has occurred. For example, the user may want to continue the ongoing playback when the maintenance event such as the occurrence of the jam while the arbitrary playback moving image indicating the work contents for, for example, replacing the toner container is being played back. Therefore, the third exemplary embodiment will be described as a method for solving such a problem.

FIGS. 11A, 11B, 11C, and 11D each illustrate an example of a screen displayed on the display device 115 according to the present exemplary embodiment. In the following description, an overview of transitions of the display screen according to the present exemplary embodiment will be described with reference to FIGS. 11A, 11B, 11C, and 11D. The CPU 101 generates display data by executing the program stored in the storage device 111, and the screens illustrated in FIGS. 11A, 11B, 11C, and 11D are displayed on the display device 115 via the display control unit 114. In the present example, the screen transition will be described, supposing that the maintenance event that is the jam at the two-sided conveyance portion (the maintenance ID is 018) has occurred after the user issues the instruction to display the work for replacing the toner container, by way of example.

Figure 11A:
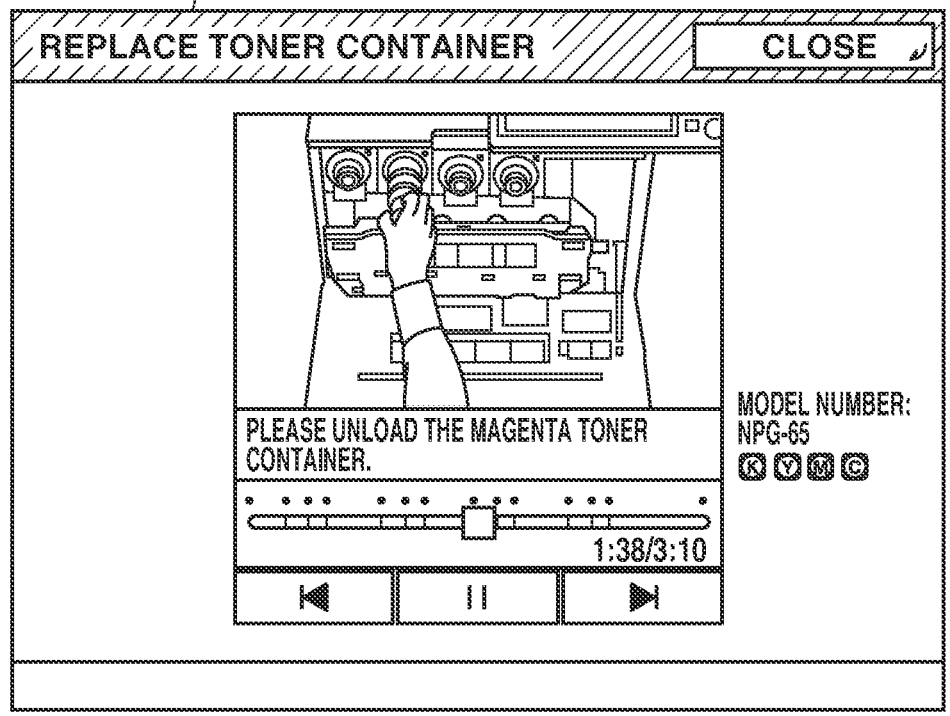
FIGS. 11A, 11B, 11C, and 11D are diagrams each illustrating an example of a screen on a display device according to a third exemplary embodiment of the present invention.

FIG. 11A illustrates an example of a maintenance screen after 8 seconds have passed since the start of the playback of the partial moving image B6 after the "replace the toner container" menu 701 had been selected on the maintenance method confirmation screen 700 illustrated in FIG. 7A.

Figure 11B:
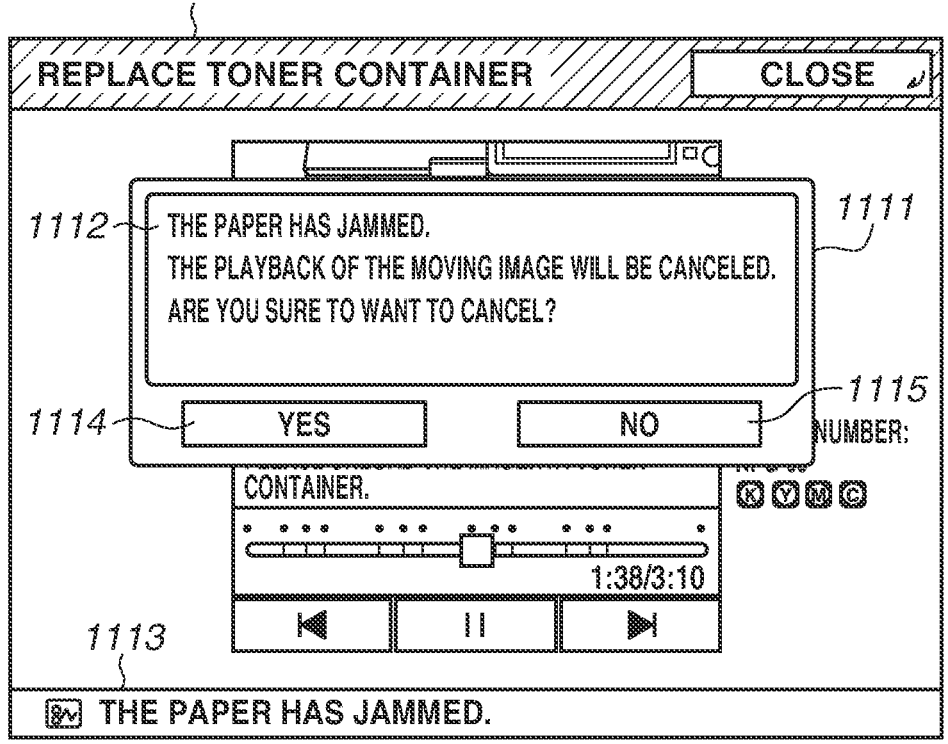
Figure 11C:
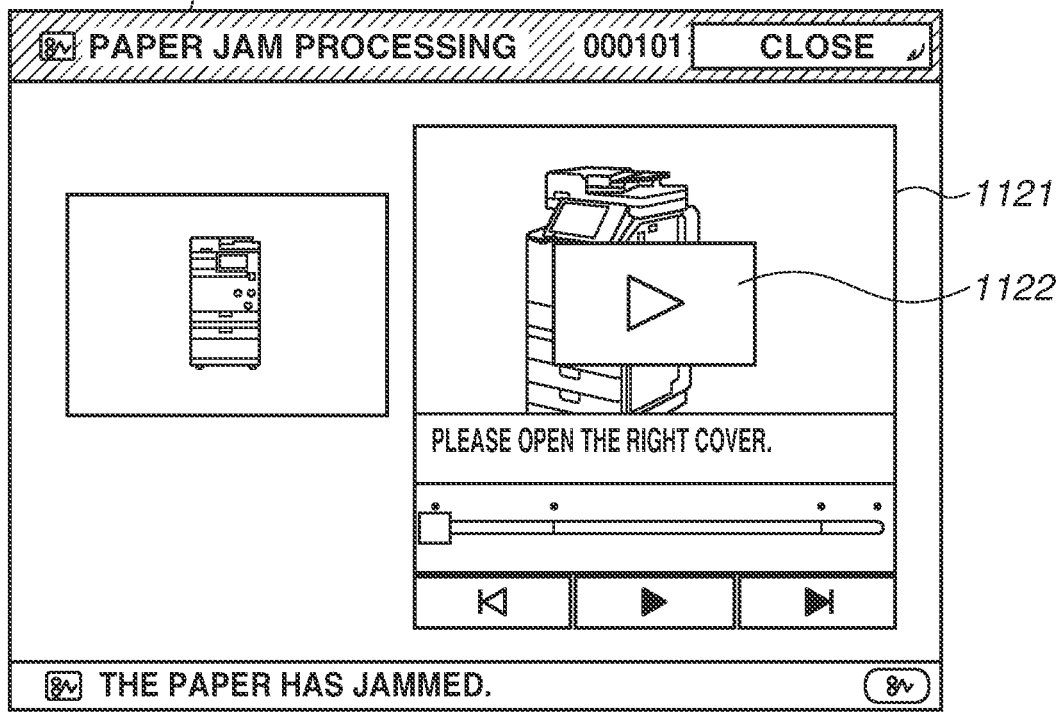

FIG. 11B illustrates an example of a maintenance screen displayed when the occurrence of the jam at the two-sided conveyance portion is detected while the partial moving image B6 is being played back. When the occurrence of the maintenance event is detected while the arbitrary playback moving image is being played back, the playback of the partial moving image is automatically paused, and a cancel confirmation dialog 1111 for allowing the user to select whether to cancel the playback of the moving image is displayed. A cancel confirmation message region 1112, a "yes" button 1114, and a "no" button 1115 are displayed on the cancel confirmation dialog 1111. Further, in FIG. 11B, "the paper has jammed", which is the message corresponding to the jam, is displayed in a status display region 1113.

If the "yes" button 1114 is pressed on the cancel confirmation dialog 1111, a screen 1120 in a state stopped at the beginning of C1, which is the first partial moving image in the event occurrence moving image, is preferentially displayed on the display device 115. A moving image display region 1121 for displaying the event occurrence moving image, and a playback mark 1122 are displayed on the maintenance screen 1120 illustrated in FIG. 11C.

Figure 11D:
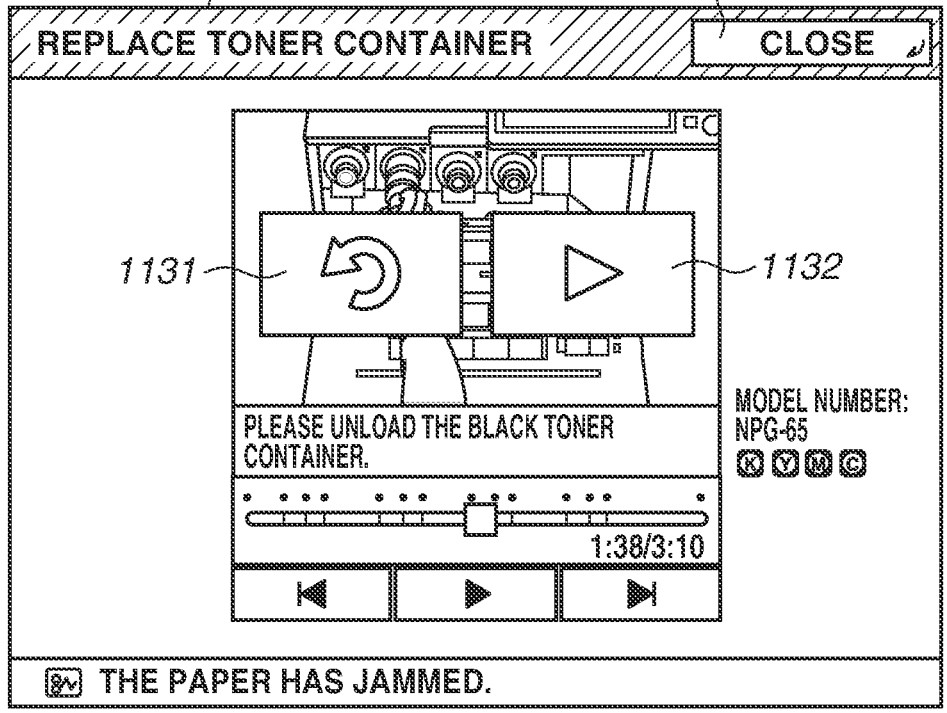

On the other hand, if the "no" button 1115 is pressed on the cancel confirmation dialog 1111, a playback mark 1132 is displayed together with a replay mark 1131 on a maintenance screen 1130 illustrated in FIG. 11D. This display allows the user to continue the playback of the partial moving image B6 that has been played back halfway.

Figure 12B:
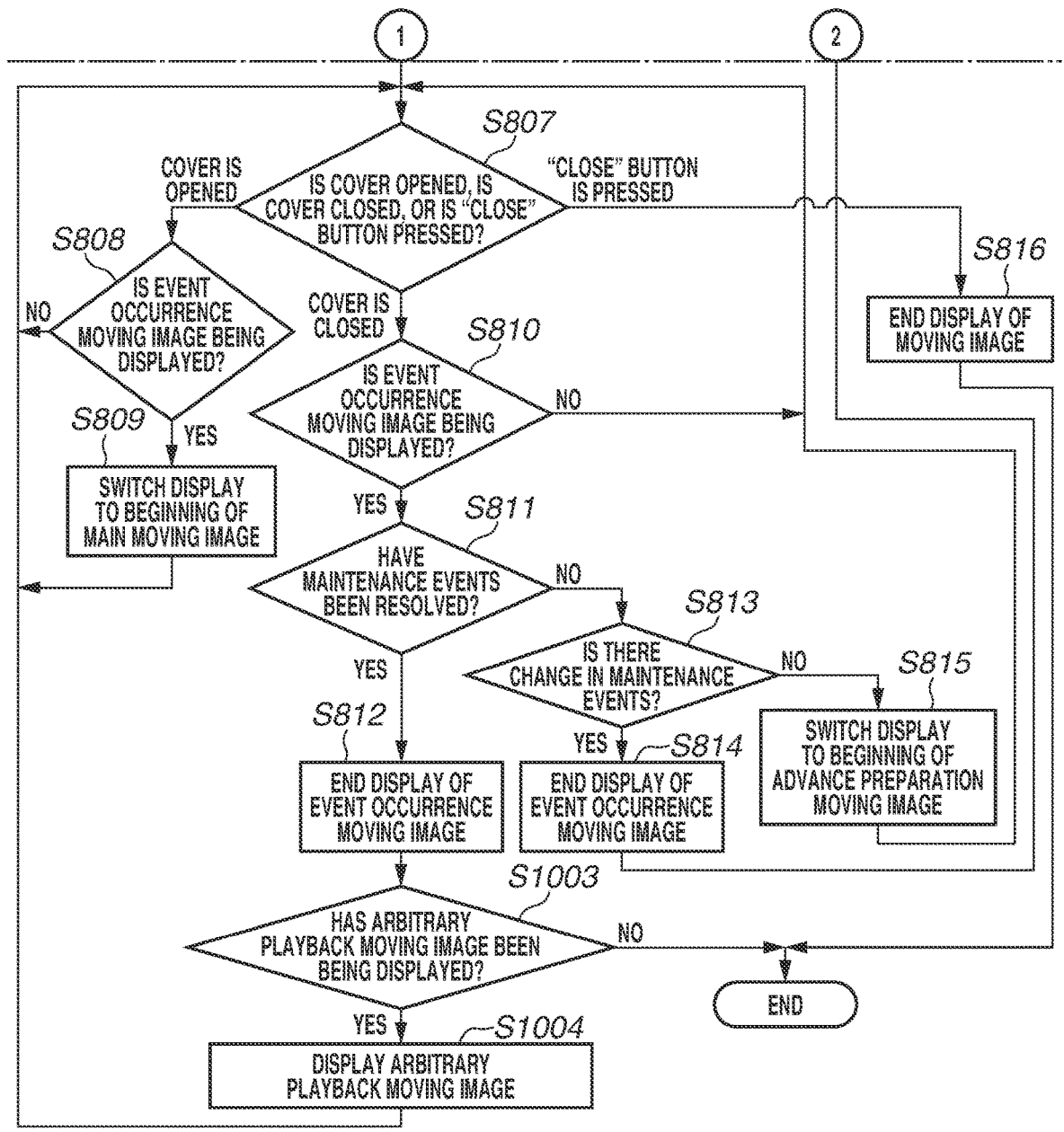
FIG. 12 (consisting of FIGS. 12A and 12B) is a flowchart illustrating processing for displaying a moving image indicating a maintenance method according to the third exemplary embodiment of the present invention.

Next, processing for displaying the moving image indicating the maintenance method according to the present exemplary embodiment will be described with reference to FIG. 12 (consisting of FIGS. 12A and 12B). The CPU 101 executes the program stored in the storage device 111, thereby performing each step illustrated in a flowchart of FIG. 12. Similar processes to the processes illustrated in FIG. 10 that have been described in the second exemplary embodiment will be omitted from the description by being indicated by the same step numbers. In FIG. 12, processes of steps S1102 and S1103 are added differently from FIG. 10.

In step S801, if the occurrence of the maintenance event is detected (YES in step S801) and the CPU 101 determines that the maintenance moving image is being displayed in step S1001 (YES in step S1001), the processing proceeds to step S1102. In step S1102, the CPU 101 displays the cancel confirmation dialog 1111 like the example illustrated in FIG. 11B.

Subsequently, in step S1103, the CPU 101 determines whether an instruction to cancel the display of the arbitrary playback moving image is issued. More specifically, the CPU 101 determines whether the "yes" button 1114 is pressed or the "no" button 1115 is pressed on the cancel confirmation dialog 1111.

If the CPU 101 determines that the "yes" button 1114 is pressed in step S1103 (YES in step S1103), the processing proceeds to step S1002 and the steps subsequent thereto. Then, the CPU 101 ends the display of the arbitrary playback moving image and switches the display to the event occurrence moving image. On the other hand, in step S1103, if the CPU 101 determines that the "no" button 1115 is pressed (NO in step S1103), the processing proceeds to step S807, in which the CPU 101 continues the display of the arbitrary playback moving image without switching the display to the event occurrence moving image.

As described above, according to the present exemplary embodiment, when the job is input from outside and the maintenance event has occurred while the arbitrary playback moving image is being played back, the image forming apparatus 100 displays the confirmation screen for allowing the user to select whether to cancel the display of the arbitrary playback moving image. Through this operation, the image forming apparatus 100 allows the user to continue the playback of the arbitrary playback moving image that has been played back halfway, thereby enabling improving the usability of the image forming apparatus 100.

Next, a fourth exemplary embodiment for implementing the present invention will be described, focusing on differences from the first to third exemplary embodiments. In the first to third exemplary embodiments, while the arbitrary playback moving image is being played back, the display of this arbitrary playback moving image continues even when the opening/closing of the cover corresponding to the maintenance ID is detected (the processing proceeds from step S807 to S808 and the CPU 101 determines NO in step S808, or the processing proceeds from step S807 to S810 and the CPU 101 determines NO in step S810). On the other hand, if an operation such as opening the cover indicated in the advance preparation moving image is performed when a job is input from an external different user while the arbitrary playback moving image is being displayed to, for example, explain the maintenance method to a user, this operation may interrupt the execution of the job input from outside. Therefore, the fourth exemplary embodiment will be described as a method for solving such a problem.

FIGS. 13A, 13B, 13C, and 13D each illustrate an example of a screen displayed on the display device 115 according to the present exemplary embodiment. In the following description, an overview of transitions of the display screen according to the present exemplary embodiment will be described with reference to FIGS. 13A, 13B, 13C, and 13D. The CPU 101 generates display data by executing the program stored in the storage device 111, and the screens illustrated in FIGS. 13A, 13B, 13C, and 13D are displayed on the display device 115 via the display control unit 114. In the present example, the screen transition will be described, supposing that the opening of the front cover 202 is detected after the user issues the instruction to display the work for replacing the toner container, by way of example.

Figure 13A:
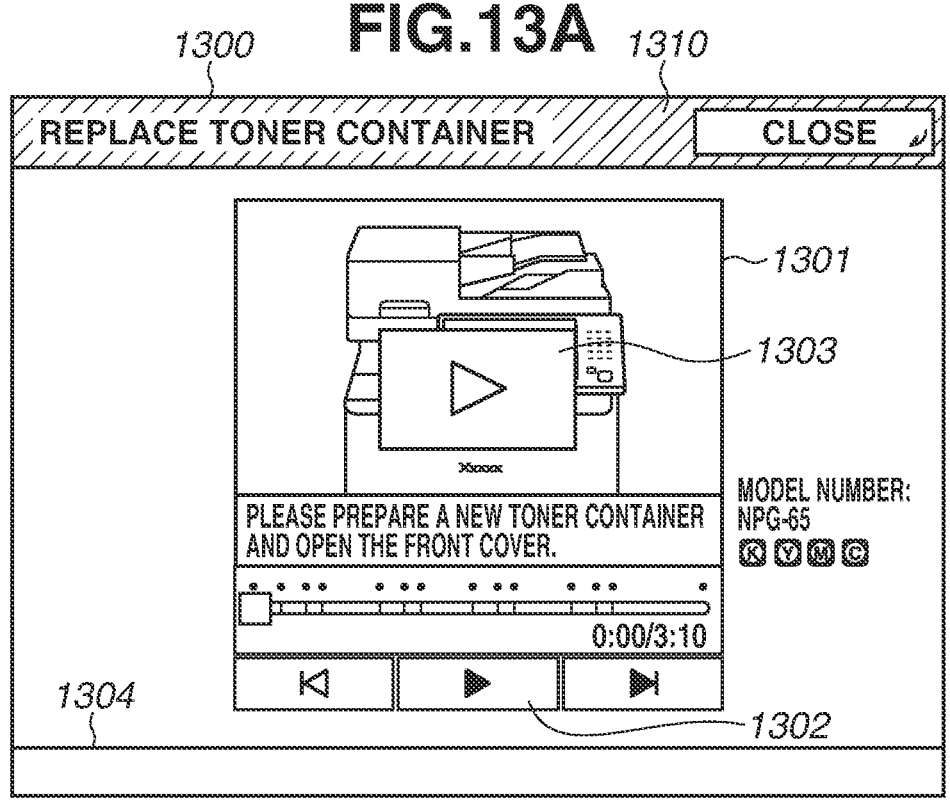
FIGS. 13A, 13B, 13C, and 13D are diagrams each illustrating an example of a screen on a display device according to a fourth exemplary embodiment of the present invention.

FIG. 13A illustrates an example of a maintenance screen displayed first when the "replace toner container" menu 701 is selected on the maintenance method confirmation screen 700 illustrated in FIG. 7A. In the case of the replacement of the toner container (the maintenance ID is 016), the partial moving images having the moving image IDs B1, B2, B3, B4, B5, B6, B7, B8, B9, and B10, respectively, are supposed to be played back in order according to the moving image list table 400. In FIG. 13A, a screen 1300 in a state stopped at the beginning of the partial moving image B1, which is the advance preparation moving image, is displayed. Items displayed on the maintenance screen 1300 include a moving image display region 1301 for displaying the arbitrary playback moving image, a playback button 1302, a playback mark 1303, and a status display region 1304. However, as illustrated in FIG. 13A, the message corresponding to the maintenance event is not displayed in the status display region 1304 under the situation where the maintenance event has not occurred.

Figure 13B:
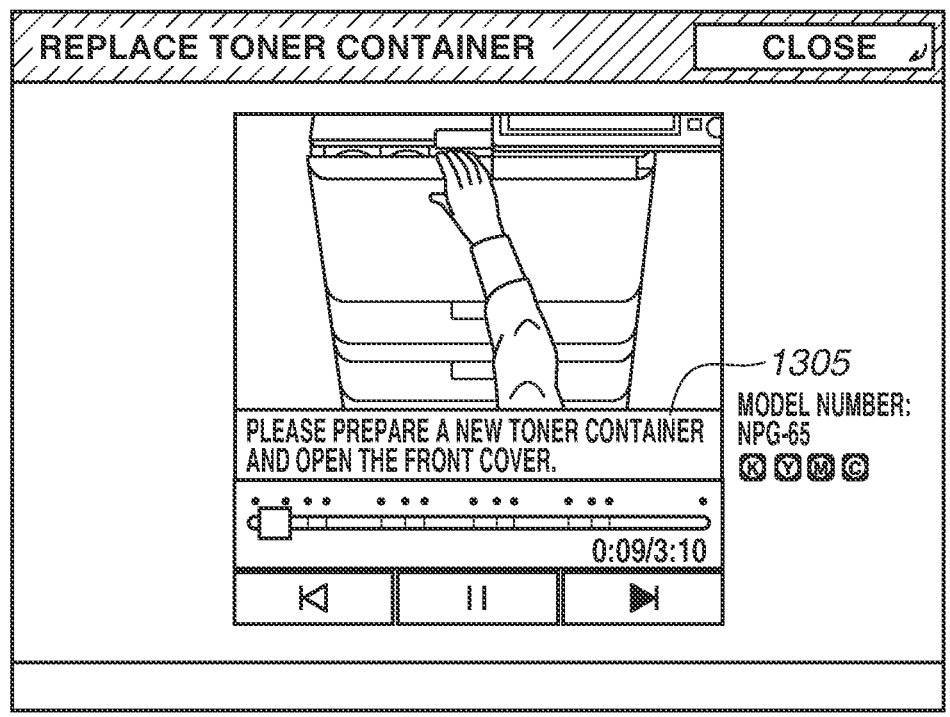

If the playback button 1302 or the playback mark 1303 is pressed on the maintenance screen 1300 illustrated in FIG. 13A, the playback of the arbitrary playback moving image is started. If the maintenance ID is 016, the playback of the partial moving image B1, which is the advance preparation moving image, is started. FIG. 13B illustrates an example of a maintenance screen after 9 seconds have passed since the start of the playback of the partial moving image B1. "Please prepare a new toner container and open the front cover", which is the message corresponding to the partial moving image B1, is displayed in the message region 1305 on the screen illustrated in FIG. 13B.

Figure 13C:
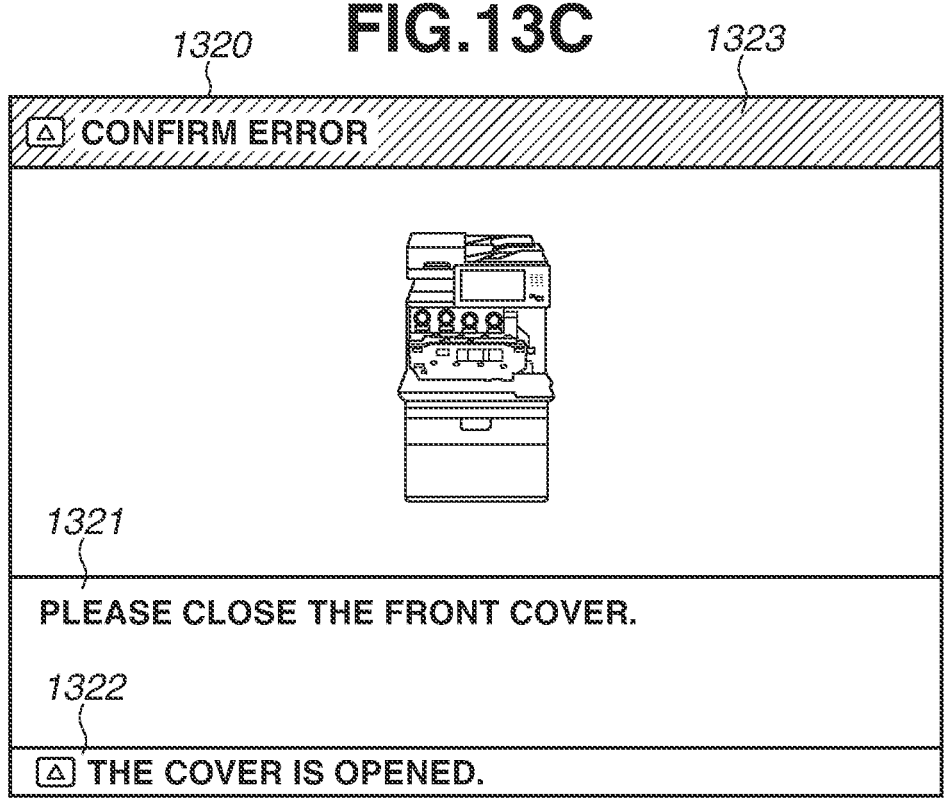

FIG. 13C illustrates an example of a screen displayed when the opening of the front cover 202 is detected while the partial moving image B1 is being played back. When the opening of the front cover 202 is detected, the playback of the partial moving image B1 is automatically ended, and a cover close screen 1320 for prompting the user to close the front cover 202 is preferentially displayed on the display device 115. A cover close message region 1321 and a status display region 1322 are displayed on the cover close screen 1320. In FIG. 13C, "please close the front cover" is displayed in the cover close message region 1321, and "the cover is opened" is displayed in the status display region 1322. Further, as a difference between the screen 1300 and the screen 1320, while the title display region 1310 is expressed in gray mildly calling attention on the screen 1300, the title display region 1323 is expressed in orange strongly calling attention on the screen 1320.

Figure 13D:
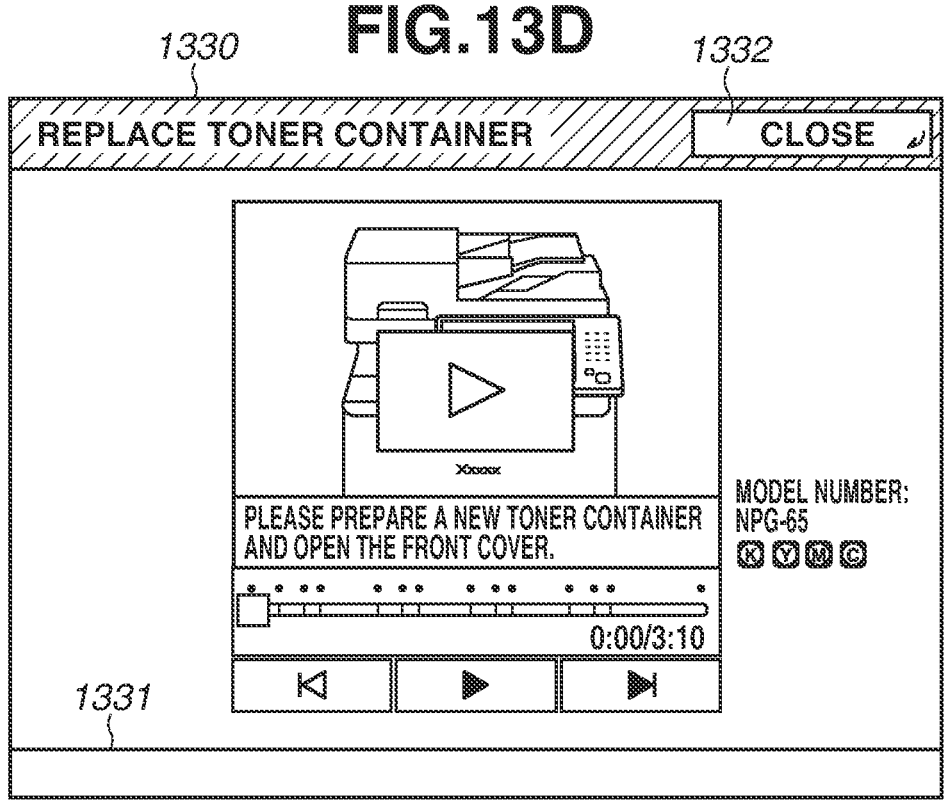

FIG. 13D illustrates an example of a maintenance screen displayed when the closing of the front cover 202 is detected while the screen 1320 illustrated in FIG. 13C is being displayed. When the closing of the front cover 202 is detected, the arbitrary playback moving image that has been displayed before the cover close screen 1320 is displayed is displayed. In this case, a screen 1330 in a state stopped at the beginning of B1, which is the first partial moving image in the arbitrary playback moving image corresponding to the replacement of the toner container, is displayed. As illustrated in FIG. 13D, the message "the cover is opened" is not displayed in the status display region 1331 since the opening of the cover 202 has been resolved. If a "close" button 1332 is pressed at that time, the display of the maintenance screen 1330 is ended.

Figure 14:
FIG. 14 (consisting of FIGS. 14A and 14B) is a flowchart illustrating processing for displaying a moving image indicating a maintenance method according to the fourth exemplary embodiment of the present invention.
Figure 14A:
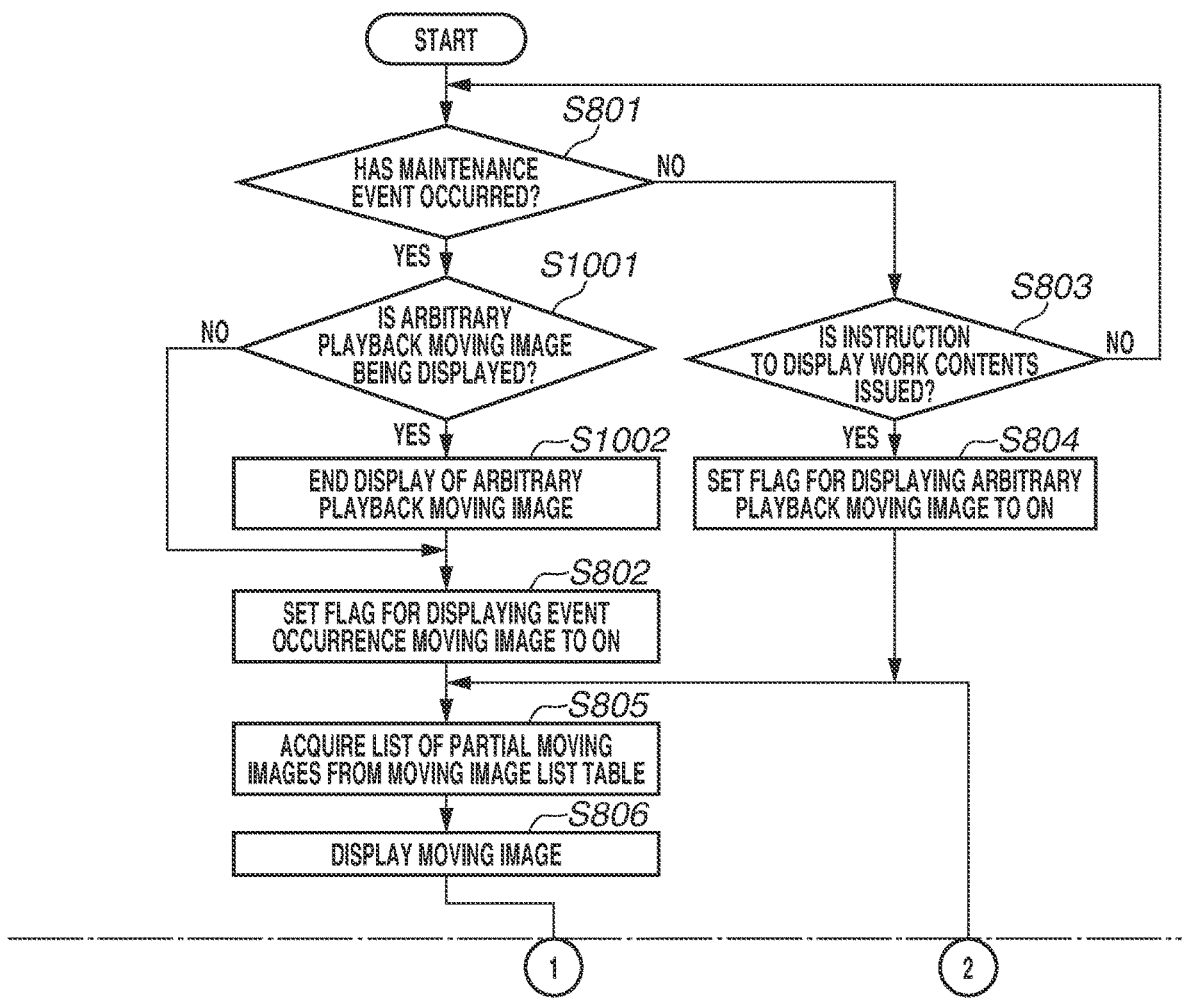
Figure 14B:
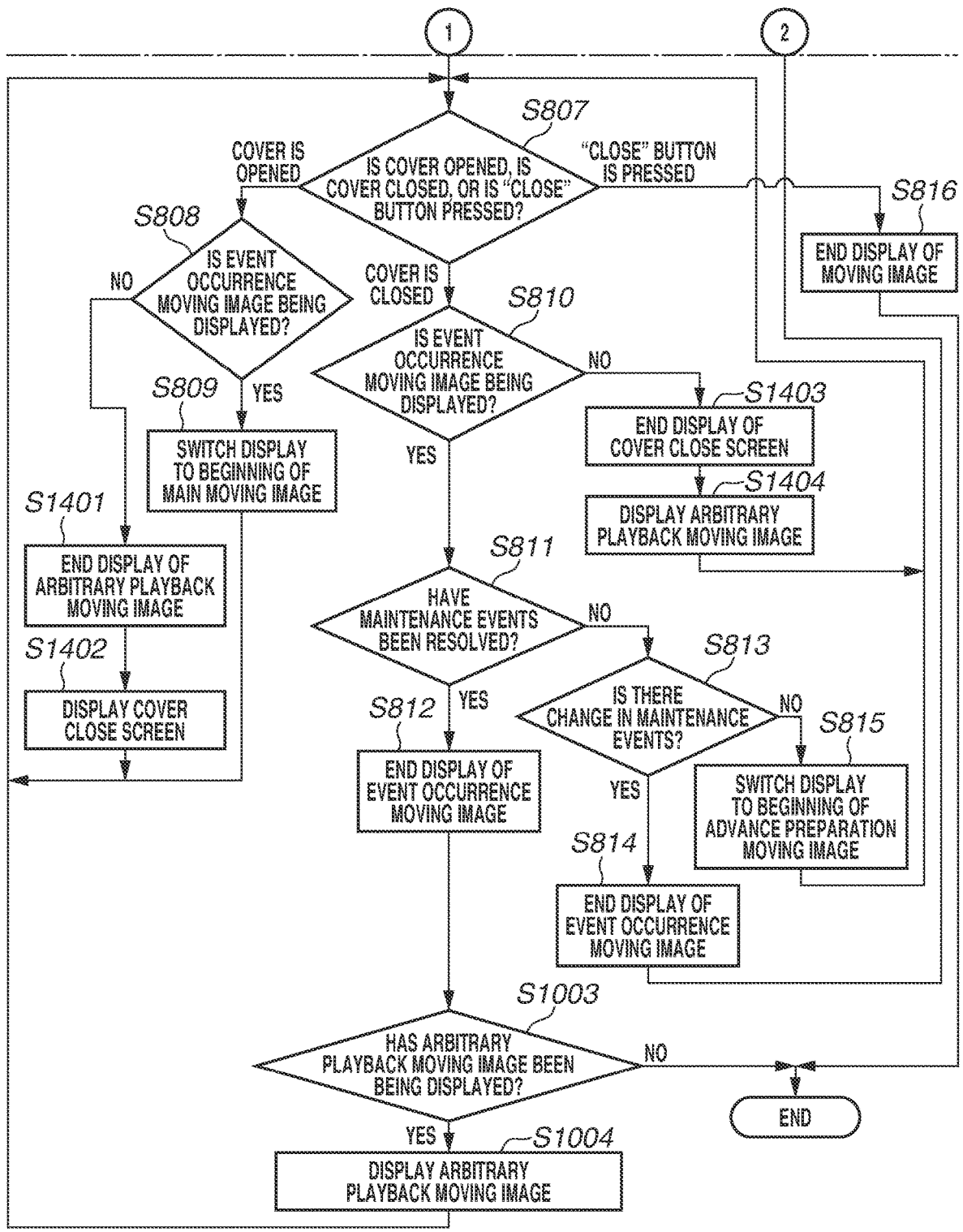

Next, processing for displaying the series of work contents required to resolve the maintenance event according to the present exemplary embodiment will be described with reference to FIG. 14 (consisting of FIGS. 14A and 14B). The CPU 101 executes the program stored in the storage device 111, thereby performing each step illustrated in a flowchart of FIG. 14. This flowchart will be described, focusing on differences from the flowchart of FIG. 10 that has been described in the second exemplary embodiment. Similar processes to the processes illustrated in FIG. 10 will be omitted from the description by being indicated by the same step numbers. In FIG. 14, processes in steps S1401 to S1404 are newly added to the flowchart in FIG. 10. Alternatively, the present flowchart may also be configured in such a manner that the processes of steps S1401 to S1404 are added to the flowchart in FIG. 8 or 12 instead of FIG. 10.

In step S807, if the CPU 101 determines that the cover corresponding to the currently displayed moving image is opened (COVER IS OPENED in step S807) and, in step S808, determines that the arbitrary playback moving image is being displayed (NO in step S808), the processing proceeds to step S1401. In step S1401, the CPU 101 stops the display of this arbitrary playback moving image. However, the CPU 101 does not set the flag for displaying the arbitrary playback moving image to OFF because the display of the arbitrary playback moving image is only temporarily stopped at this time. Then, in step S1402, the CPU 101 displays the cover close screen 1320, thereby prompting the user to close the cover.

On the other hand, in step S807, if the CPU 101 determines that the cover is closed (COVER IS CLOSED in step S807), and in step S810, determines that the arbitrary playback moving image is being displayed (NO in step S810), the processing proceeds to step S1403. In step S1403, the CPU 101 ends the display of the cover close screen 1320. Then, in step S1404, the CPU 101 displays again the arbitrary playback moving image that has been displayed before the cover close screen 1320 is displayed.

In the above-described manner, according to the present exemplary embodiment, when the work of opening the cover indicated in the advance preparation moving image is performed while the arbitrary playback moving image is being played back, the cover close screen 1320 is preferentially displayed. As a result, the user can swiftly resolve such a problem that the execution of the job input from outside is undesirably interrupted.

Other Exemplary Embodiments

Although each of the exemplary embodiments have been described independently, the image forming apparatus according to the above-described first to fourth exemplary embodiments may be configured to include a switch for instructing the image forming apparatus to perform each of the operations, and allow the user to instruct the image forming apparatus to perform any of the operations with use of this switch.

Further, the above-described exemplary embodiments have been described based on the maintenance event such as the lack of the toner, the waste toner full, and the jam, but the image forming apparatus may be configured to be able to detect a maintenance event such as a lack of staples and expiration of a lifetime of the drum, and the detectable maintenance events are not limited thereto.

Further, the exemplary embodiments have been described based on the image forming apparatus having the plurality of functions such as the copy function and the scanner function by way of example, but the present invention can also be applied even to an image processing apparatus having only a part of these functions. Further, the present invention may also be applied to another information processing apparatus, such as a personal computer, a personal digital assistant (PDA), a mobile phone, a facsimile machine (FAX), a camera, a video camera, and another image viewer.

As described above, according to each of the above-described exemplary embodiments, even when the maintenance event has not occurred, the image processing apparatus allows the user to confirm the maintenance method corresponding to this maintenance event in advance, thereby enabling improving the usability of the image processing apparatus.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-188415, filed Sep. 27, 2016, which is hereby incorporated by reference herein in its entirety.

What is claimed is:

1. An image processing apparatus comprising:
at least a processor and at least a memory coupled to the at least the processor and having stored thereon instructions,
when executed by the at least the processor, and cooperating to act as:
an event detection unit configured to detect a maintenance event;

a detection unit configured to detect whether a cover of the image processing apparatus is in an open state or a closed state;

a reception unit configured to receive an instruction to display a first maintenance screen corresponding to a maintenance event;

a display control unit configured to display the first maintenance screen including a moving image illustrating a maintenance method based on receipt of the instruction by the reception unit in a state where the maintenance event is not detected and display a second maintenance screen including a moving image illustrating a maintenance method based on a detection of the maintenance event;

wherein the display control unit is further configured to:
upon detecting opening of the cover of the image processing apparatus while the first maintenance screen is displayed, display a cover close screen for prompting a user to close the cover.

2. The image processing apparatus according to claim 1, wherein the cover close screen is not displayed even if the opening of the cover is detected while the second maintenance screen is displayed.

3. The image processing apparatus according to claim 2, wherein, if the opening of the cover is detected while the second maintenance screen is displayed and if closing of the cover thereafter is detected, it is determined whether the maintenance event has been resolved or not, and if it is determined that the maintenance event has been resolved, the second maintenance screen displayed based on the detection of the maintenance event is put into a non-displayed state.

4. The image processing apparatus according to claim 2, wherein
if the opening of the cover is detected while the second maintenance screen is displayed and if closing of the cover thereafter is detected, it is determined whether the maintenance event has been resolved or not, and if it is determined that the maintenance event has not been resolved, it is determined whether there is any change in the maintenance event.

5. The image processing apparatus according to claim 4, wherein if it is determined that there is a change in the maintenance event, the second maintenance screen displayed based on the detection of the maintenance event is put into a non-displayed state.

6. The image processing apparatus according to claim 4, wherein, if it is determined that there is not any change in the maintenance event, a playback position of the second maintenance screen is changed.

7. The image processing apparatus according to claim 1, wherein the maintenance event detected by the event detection unit includes a lack of toner, and
wherein the maintenance screen corresponding to the lack of the toner is a screen for replacing a toner container.

8. The image processing apparatus according to claim 1, wherein the maintenance event detected by the event detection unit includes a jam of a sheet, and
wherein the maintenance screen corresponding to the jam is a screen for removing the jammed sheet.

9. A method for controlling an image processing apparatus, comprising:
event detecting a maintenance event;
detecting whether a cover of the image processing apparatus is in an open state or a closed state;
receiving an instruction to display a first maintenance screen corresponding to a maintenance event;
displaying the first maintenance screen including a moving image illustrating a maintenance method based on receipt of the instruction by the receiving in a state where the maintenance event is not detected and displaying a second maintenance screen including a moving image illustrating a maintenance method based on a detection of the maintenance event; and
displaying a cover close screen for prompting a user to close the cover upon detecting opening of the cover of the image processing apparatus while the first maintenance screen is displayed.

10. The method according to claim 9, wherein the cover close screen is not displayed even if the opening of the cover is detected while the second maintenance screen is displayed.

11. The method according to claim 10, wherein, if the opening of the cover is detected while the second maintenance screen is displayed and if closing of the cover thereafter is detected, it is determined whether the maintenance event has been resolved or not, and if it is determined that the maintenance event has been resolved, the second maintenance screen displayed based on the detection of the maintenance event is put into a non-displayed state.

12. The method according to claim 10, wherein
if the opening of the cover is detected while the second maintenance screen is displayed and if closing of the cover thereafter is detected, it is determined whether the maintenance event has been resolved or not, and if it is determined that the maintenance event has not been resolved, it is determined whether there is any change in the maintenance event.

13. The method according to claim 9,
wherein the maintenance event detected by the event detecting includes a lack of toner, and
wherein the maintenance screen corresponding to the lack of the toner is a screen for replacing a toner container.

14. The method according to claim 9,
wherein the maintenance event detected by the event detecting includes a jam of a sheet, and
wherein the maintenance screen corresponding to the jam is a screen for removing the jammed sheet.

15. A non-transitory computer-readable storage medium storing a program for causing a computer to perform a method for controlling an image processing apparatus, the method comprising:
event detecting a maintenance event;
detecting whether a cover of the image processing apparatus is in an open state or a closed state;
receiving an instruction to display a first maintenance screen corresponding to a maintenance event;
displaying the first maintenance screen including a moving image illustrating a maintenance method based on receipt of the instruction by the receiving in a state where the maintenance event is not detected and displaying a second maintenance screen including a moving image illustrating a maintenance method based on a detection of the maintenance event; and
displaying a cover close screen for prompting a user to close the cover upon detecting opening of the cover of the image processing apparatus while the first maintenance screen is displayed.

16. The non-transitory computer-readable storage medium according to claim 15, wherein the cover close screen is not displayed even if the opening of the cover is detected while the second maintenance screen is displayed.

17. The non-transitory computer-readable storage medium according to claim 16, wherein, if the opening of the cover is detected while the second maintenance screen is displayed and if closing of the cover thereafter is detected, it is determined whether the maintenance event has been resolved or not, and if it is determined that the maintenance event has been resolved, the second maintenance screen displayed based on the detection of the maintenance event is put into a non-displayed state.

18. The non-transitory computer-readable storage medium according to claim 16, wherein
   if the opening of the cover is detected while the second maintenance screen is displayed and if closing of the cover thereafter is detected, it is determined whether the maintenance event has been resolved or not, and if it is determined that the maintenance event has not been resolved, it is determined whether there is any change in the maintenance event.

19. The non-transitory computer-readable storage medium according to claim 15,
   wherein the maintenance event detected by the event detecting includes a lack of toner, and
   wherein the maintenance screen corresponding to the lack of the toner is a screen for replacing a toner container.

20. The non-transitory computer-readable storage medium according to claim 15,
   wherein the maintenance event detected by the event detecting includes a jam of a sheet, and
   wherein the maintenance screen corresponding to the jam is a screen for removing the jammed sheet.

\* \* \* \* \*